US009462464B2

United States Patent
Patil et al.

(10) Patent No.: US 9,462,464 B2
(45) Date of Patent: Oct. 4, 2016

(54) SECURE AND SIMPLIFIED PROCEDURE FOR JOINING A SOCIAL WI-FI MESH NETWORK

(71) Applicant: QUALCOMM Incorporated, San Diego, CA (US)

(72) Inventors: Abhishek Pramod Patil, San Diego, CA (US); Soo Bum Lee, San Diego, CA (US); George Cherian, San Diego, CA (US); Alireza Raissinia, Monte Sereno, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 14/227,872

(22) Filed: Mar. 27, 2014

(65) Prior Publication Data

US 2015/0281952 A1    Oct. 1, 2015

(51) Int. Cl.
| | | |
|---|---|---|
| *H04L 9/32* | (2006.01) | |
| *H04W 12/04* | (2009.01) | |
| *H04L 29/06* | (2006.01) | |
| *H04W 12/06* | (2009.01) | |
| *H04W 84/18* | (2009.01) | |
| *H04W 8/00* | (2009.01) | |

(52) U.S. Cl.
CPC .......... *H04W 12/04* (2013.01); *H04L 63/0428* (2013.01); *H04L 63/065* (2013.01); *H04L 63/0815* (2013.01); *H04W 12/06* (2013.01); *H04W 8/005* (2013.01); *H04W 84/18* (2013.01)

(58) Field of Classification Search
CPC ................. H04L 63/065; H04L 63/08; H04L 63/04288; H04L 63/0815; H04W 8/005; H04W 12/04; H04W 12/06; H04W 84/18
See application file for complete search history.

(56) References Cited

U.S. PATENT DOCUMENTS

2005/0243765 A1* 11/2005 Schrader et al. ............. 370/328
2007/0297371 A1* 12/2007 Lea .............................. 370/334

(Continued)

FOREIGN PATENT DOCUMENTS

WO    WO-2006126801 A1    11/2006

OTHER PUBLICATIONS

ISA/EPO, International Search Report and Written Opinion of the International Searching Authority, Int'l. App. No. PCT/US2015/020686, Sep. 18, 2015, European Patent Office, Rijswijk, NL, 15 pgs.
Egners et al., "Wireless Mesh Network Security: State of Affairs," 2010 IEEE 35th Conference on Local Computer Networks (LCN), Denver, CO, Oct. 10-14, 2010, pp. 997-1004, XP031986902, DOI: 10.1109/LCN.2010.5735848, ISBN 978-1-4244-8387-7, Institute of Electrical and Electronics Engineers.

(Continued)

*Primary Examiner* — Shewaye Gelagay
*Assistant Examiner* — Amie C Lin
(74) *Attorney, Agent, or Firm* — Holland & Hart LLP

(57) ABSTRACT

Methods, systems, and devices are described for communications via a mesh network. To join an existing mesh network, a wireless communication device may identify a member device from a plurality of member devices of an existing mesh network. The wireless communication device may communicate with the identified member device to participate in a single authentication procedure. Upon successfully completing the single authentication procedure, the wireless communication device may join the existing mesh network without needing any additional authentication procedures with another member device of the plurality of member devices to join the existing mesh network. This approach may be used for any mesh network, such as a social Wi-Fi mesh network.

35 Claims, 12 Drawing Sheets

(56) References Cited

U.S. PATENT DOCUMENTS

| | | | |
|---|---|---|---|
| 2008/0065884 A1* | 3/2008 | Emeott et al. | 713/168 |
| 2009/0054033 A1* | 2/2009 | Pratt et al. | 455/410 |
| 2009/0086973 A1 | 4/2009 | Buddhikot et al. | |
| 2010/0191968 A1 | 7/2010 | Patil et al. | |
| 2012/0237033 A1* | 9/2012 | Tanaka et al. | 380/270 |
| 2013/0042313 A1* | 2/2013 | Lambert | 726/7 |
| 2013/0294230 A1* | 11/2013 | Popa et al. | 370/230 |

OTHER PUBLICATIONS

ISA/EPO, Partial International Search Report of the International Searching Authority, Int'l. App. No. PCT/US2015/020686, Jun. 30, 2015, European Patent Office, Rijswijk, NL, 5 pgs.

IPEA/EPO, Second Written Opinion of the International Preliminary Examining Authority, Int'l. App. No. PCT/US2015/020686, Mar. 18, 2016, European Patent Office, Munich, DE, 7 pgs.

\* cited by examiner

SECURE AND SIMPLIFIED PROCEDURE FOR JOINING A SOCIAL WI-FI MESH NETWORK

BACKGROUND

The following relates generally to wireless communication, and more specifically to wireless communications via a mesh network. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Mobile devices (and other wireless communication devices) may form networks without base stations or equipment other than the mobile devices themselves. One example of such networks is known as a mesh network. In order for a device to join a mesh network, the device must "peer" with the member devices of the mesh network. The devices (peers) may use a secure password-based authentication and key establishment protocol called "Simultaneous Authentication of Equals" (SAE). When the device wishing to join and each of the member devices discover each other (and security is enabled), the device wishing to join performs a separate SAE exchange with each of the member devices. If SAE completes successfully, each peer knows the other party possesses the mesh password and, as a by-product of the SAE exchange, the device wishing to join establishes a cryptographically strong key with each of the member devices. This key is used with the "Authenticated Mesh Peering Exchange" (AMPE) to establish a secure peering and derive a session key to protect mesh traffic, including routing traffic.

However, problems for mesh networks result from such conventional secure peering. First, conventional peering involves an exchange of many messages with each individual member device of the network in order to join the network. Overhead associated with maintaining state information for each peer in the mesh network may also reduce the overall performance of devices in the network.

SUMMARY

The described features generally relate to one or more improved systems, methods, and/or apparatuses for communications via a mesh network. In general, the approach is to simplify peering for joining a mesh network. The approach may involve a single authentication procedure for a wireless communication device to join an existing mesh network. Once a wireless communication device identifies a member device of an existing mesh network, the wireless communication device may communicate with the identified member device to execute an authentication procedure. Upon successfully completing the authentication procedure, the wireless communication device may join the existing mesh network without needing any additional authentication procedures, such as with another member device of the existing mesh network.

Another aspect is the use of a single common group key to encrypt all group addressed traffic in the mesh network. Yet another aspect involves management of the common group key.

Another aspect involves an approach for addressing the possibility of fragmentation in mesh networking. The approach may help reduce a number of duplicate (fragmented) mesh networks, e.g., providing one or more same services. For example, the approach may enable fragmented mesh networks to merge.

A method for communications via a mesh network is described. In one configuration, the method may involve identifying a member device from a plurality of member devices of an existing mesh network and communicating with the identified member device to participate in a single authentication procedure. Upon successfully completing the single authentication procedure, the existing mesh network may be joined without needing any additional authentication procedures with another member device of the plurality of member devices to join the existing mesh network.

In some embodiments, the joining of the existing mesh network may involve receiving a common group key for communicating with any of the plurality of member devices of the existing mesh network. In such embodiments, the method may involve encrypting a message using the common group key and sending the encrypted message to any of the plurality of member devices via the mesh network. Also, the method may involve receiving an encrypted message from any of the plurality of member devices via the mesh network and decrypting the received encrypted message using the common group key.

In some embodiments, the communicating with the identified member device to participate in the single authentication procedure may involve sending an authentication request including a first public value to the identified member device. The first public value may be generated using a password element and a first nonce. The password element may be generated from a password in common with the identified member device.

In some embodiments, the communicating with the identified member device to participate in the single authentication procedure also may involve receiving an authentication response including a second public value from the identified member device. The second public value may be generated using the password element and a second nonce. The password element may be generated from the password in common.

In some embodiments, the communicating with the identified member device to participate in the single authentication procedure also may involve generating a pairwise master key (PMK) using the first and second public values. A pairwise transient key (PTK) may be generated using the generated PMK.

Further, in some embodiments, the communicating with the identified member device to participate in the single authentication procedure may involve sending an association request including a message integrity code (MIC) to the identified member device. The MIC may be generated using the generated PTK. In such embodiments, the method may involve receiving an association response including a common group key for communicating with any of the plurality of member devices of the existing mesh network.

In some embodiments, the association response including the common group key may be received only if the MIC included in the association request is correct. In some embodiments, the common group key included in the received association response may be encrypted using the PTK. Alternatively or additionally, the association request and the association response may be protected by the PTK.

Further, in some embodiments, the communicating with the identified member device to participate in the single authentication procedure may involve sending an internet protocol (IP) address request along with the association request. In such embodiments, the method may involve receiving an IP address response along with the association response. The IP address response may assign an IP address.

In some embodiments, the method may involve a social Wi-Fi mesh network that enables Wi-Fi devices to synchronize to a common discovery window for service discovery and mesh parameter exchange.

In some embodiments, the method may involve receiving a common group key for communicating with any of the plurality of member devices of the existing mesh network, a current nonce and a predetermined text. In such embodiments, the method may involve generating a mesh key using the common group key, the current nonce and the predetermined text. In some embodiments, the method also may involve receiving an update to the current nonce. In such case, the generating of the mesh key may be performed using the common group key, the update to the current nonce and the predetermined text. Alternatively or additionally, the method may involve receiving an update to the common group key. In such case, the generating of the mesh key may be performed using the update to the common group key, the current nonce and the predetermined text.

In some embodiments, the method may involve receiving a discovery message including a mesh key from one or more neighboring devices. In such embodiments, the method may involve comparing the generated mesh key with the mesh key included in the discovery message. Based on a result of the comparing, whether another mesh network exists for providing a same service as the existing mesh network may be determined.

In some embodiments, the common group key for communicating with any of the plurality of member devices of the existing mesh network may including an expiration time value. In such embodiments, the method may involve initiating a count down from a random number to a predetermined number. In such case, the count down may be initiated prior to reaching the expiration time value of the common group key. Upon reaching the predetermined number, a new common group key may be generated. The new common group key may be sent in a secure manner to the plurality of member devices via the mesh network.

In some embodiments, the method also may involve receiving a first new common group key securely via the mesh network prior to reaching the predetermined number. Upon receiving the first new common group key, the countdown may be discontinued. In such embodiments, the method may involve receiving a second new common group key securely via the mesh network within a predetermined time of receiving the first new common group key. In such case, the method may involve determining which of the first and second new common group keys is valid using one or more suppression criterion.

An apparatus for communications by a wireless communication device via a mesh network is described. In one configuration, the apparatus may include: a first processing module configured to identify a member device from a plurality of member devices of an existing mesh network; a second processing module configured to communicate with the identified member device to participate in a single authentication procedure; and, a communications management module configured to cause the wireless communication device to join the existing mesh network upon successfully completing the single authentication procedure, without needing any additional authentication procedures with another member device of the plurality of member devices to join the existing mesh network.

In some embodiments, the communications management module may be configured to receive a common group key for communicating with any of the plurality of member devices of the existing mesh network.

In some embodiments, the second processing module may be configured to: send an authentication request including a first public value to the identified member device, the first public value being generated using a password element and a first nonce, the password element being generated from a password in common with the identified member device; receive an authentication response including a second public value from the identified member device, the second public value being generated using the password element and a second nonce, the password element being generated from the password in common; generate a pairwise master key (PMK) using the first and second public values; and, generate a pairwise transient key (PTK) using the generated PMK. The second processing module also may be configured to: send an association request including a message integrity code (MIC) to the identified member device, the MIC being generated using the generated PTK; and, receive an association response including a common group key for communicating with any of the plurality of member devices of the existing mesh network. In such embodiments, the association response may include the common group key is received only if the MIC included in the association request is correct.

An apparatus for communications via a mesh network is described. In one configuration, the apparatus may include means for identifying a member device from a plurality of member devices of an existing mesh network. The apparatus also may include means for communicating with the identified member device to participate in a single authentication procedure. The apparatus further may include means for joining the existing mesh network upon successfully completing the single authentication procedure. This may be without needing any additional authentication procedures with another member device of the plurality of member devices to join the existing mesh network.

In some embodiments, the means for joining the existing mesh network may include means for receiving a common group key for communicating with any of the plurality of member devices of the existing mesh network. In such embodiments, the apparatus may include means for encrypting a message using the common group key and means for sending the encrypted message to any of the plurality of member devices via the mesh network. Alternatively or additionally, the apparatus may include means for receiving an encrypted message from any of the plurality of member devices via the mesh network and means for decrypting the received encrypted message using the common group key.

In some embodiments, the means for communicating with the identified member device to participate in the single authentication procedure may be configured to send an authentication request including a first public value to the identified member device. The first public value may be generated using a password element and a first nonce. The password element may be generated from a password in common with the identified member device.

The means for communicating further may be configured to receive an authentication response including a second public value from the identified member device. The second public value may be generated using the password element and a second nonce. The password element may be generated from the password in common.

The means for communicating further may be configured to: generate a pairwise master key (PMK) using the first and second public values; and, generate a pairwise transient key (PTK) using the generated PMK.

In some embodiments, the means for communicating with the identified member device to participate in the single authentication procedure may be configured to: send an association request including a message integrity code (MIC) to the identified member device. The MIC may be generated using the generated PTK. In such embodiments, the means for communicating may be configured to receive an association response including a common group key for communicating with any of the plurality of member devices of the existing mesh network. In some embodiments, the association response including the common group key may be received only if the MIC included in the association request is correct. In some embodiments, the common group key included in the received association response may be encrypted using the PTK. Alternatively or additionally, the association request and the association response may be protected by the PTK.

In some embodiments, the apparatus may include means for sending an internet protocol (IP) address request along with the association request. In such embodiments, the apparatus may include means for receiving an IP address response along with the association response. In such case, the IP address response may assign an IP address.

In some embodiments, the mesh network may be a social Wi-Fi mesh network that enables Wi-Fi devices to synchronize to a common discovery window for service discovery and mesh parameter exchange.

In some embodiments, the apparatus may include means for receiving a common group key for communicating with any of the plurality of member devices of the existing mesh network, a current nonce and a predetermined text. In such embodiments, the apparatus may include means for generating a mesh key using the common group key, the current nonce and the predetermined text. The apparatus also may include means for receiving an update to the current nonce. In such case, the generating of the mesh key may be performed using the common group key, the update to the current nonce and the predetermined text. Alternatively or additionally, the apparatus may include means for receiving an update to the common group key. In such case, the generating of the mesh key may be performed using the update to the common group key, the current nonce and the predetermined text.

In some embodiments, the apparatus may include means for receiving a service discovery message including a mesh key from one or more neighboring devices. In such embodiments, the apparatus may include means for comparing the generated mesh key with the mesh key included in the service discovery message. In such case, the apparatus also may include means for determining whether another mesh network exists for providing a same service as the existing mesh network based at least in part on a result of the comparing.

In some embodiments, the apparatus may include means for receiving a common group key for communicating with any of the plurality of member devices of the existing mesh network. The common group key may include an expiration time value. In such embodiments, the apparatus may include means for initiating a count down from a random number to a predetermined number. The count down may be initiated prior to reaching the expiration time value of the common group key. The apparatus further may include means for generating a new common group key upon reaching the predetermined number and means for sending the new common group key in a secure manner to the plurality of member devices via the mesh network.

Further in such embodiments, the apparatus may include means for receiving a first new common group key securely via the mesh network prior to reaching the predetermined number. In such case, the apparatus also may include means for discontinuing the countdown upon receiving the first new common group key. Alternatively or additionally, the apparatus may include means for receiving a second new common group key securely via the mesh network within a predetermined time of receiving the first new common group key. In such case, the apparatus may include means for determining which of the first and second new common group keys is valid using one or more suppression criterion.

Another configuration of an apparatus for communications via a mesh network may include at least one processor and memory in electronic communication with the at least one processor. The memory may embody instructions, which may be executable by the at least one processor to: identify a member device from a plurality of member devices of an existing mesh network; communicate with the identified member device to participate in a single authentication procedure; and, join the existing mesh network upon successfully completing the single authentication procedure, without needing any additional authentication procedures with another member device of the plurality of member devices to join the existing mesh network. In various embodiments, the apparatus may include instructions executable by the at least one processor to perform some or all of the functions and/or operations of the method described above and/or as described herein.

A computer program product is also described. The computer program product may be a non-transitory computer-readable medium storing instructions, which may be executable by a processor to: identify a member device from a plurality of member devices of an existing mesh network; communicate with the identified member device to participate in a single authentication procedure; and, join the existing mesh network upon successfully completing the single authentication procedure, without needing any additional authentication procedures with another member device of the plurality of member devices to join the existing mesh network. In various embodiments, the computer program product may include instructions executable by the processor to perform some or all of the functions and/or operations of the method described above and/or as described herein.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A mesh network may be a full mesh network in which each member device has a connection with every other device of the network. Also, a mesh network may be a partial mesh network in which some member devices may be connected in a full mesh scheme, but other member devices are only connected to one or more of the devices, but not all of the member devices of the network. Further, social Wi-Fi mesh networks may extend the capabilities of a social Wi-Fi framework to enable participating devices to establish mesh connectivity for content delivery. Mesh networks may be formed between a device and one or more other devices to provide one or more services to the device from the other device(s). In order to establish a mesh network for such communications, the device (seeker device) may discover or otherwise become aware of the other device(s) that provide a desired service. These other devices may be referred to as member device and/or advertiser devices.

If only one other device is discovered, the device seeking the service may negotiate with the other device to form a mesh network. On the other hand, if the device discovers one or more devices belonging to an existing mesh network, the device may join the existing mesh network. As noted above, conventional secure peering in accordance with the IEEE 802.11s standard involves many messages (e.g., eight) which must be repeated for each individual device of the network to join the network.

In one example of an approach to resolve problems with this known peering, a wireless communication device may perform only a single authentication procedure to join an existing mesh network. The wireless communication device may identify a member device of an existing mesh network. The wireless communication device may communicate with the identified member device to execute the single authentication procedure. Upon successfully completing the single authentication procedure, the wireless communication device may join the existing mesh network without needing any additional authentication procedures, such as with another member device of the existing mesh network. As a result, the process for peering to join the existing mesh network is simplified.

Figure 1:
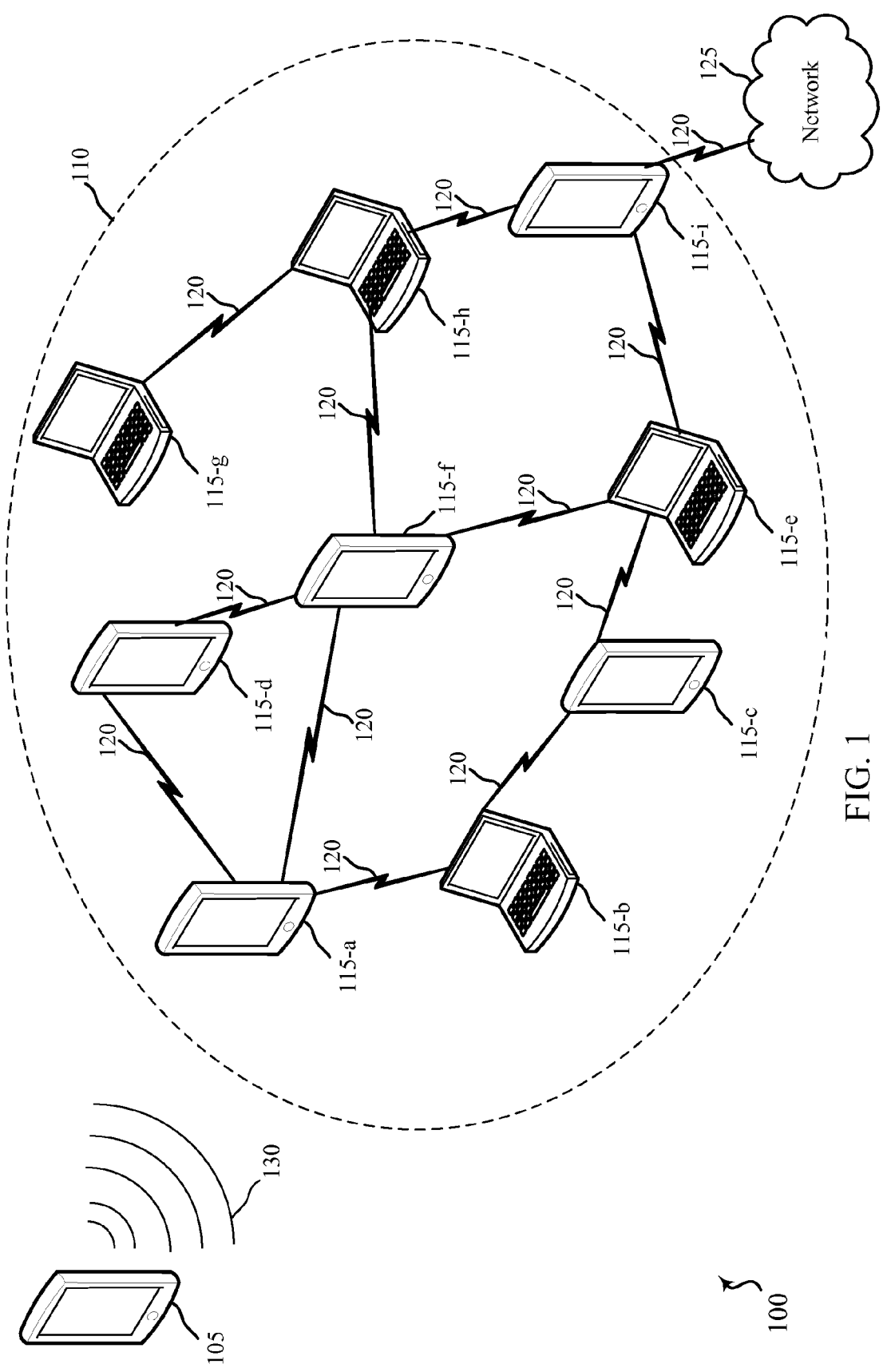
FIG. 1 shows a block diagram of a mesh network with a separate wireless communication device in proximity.

Referring first to FIG. 1, an arrangement 100 is shown that includes an established mesh network 110. The mesh network 110 may be implemented as a wired or wireless communication network of various fixed and/or mobile devices, that may be referred to as "nodes" 115 of the mesh network 110. Each of the node devices 115 may receive and communicate data throughout the mesh network, such as throughout a college campus, metropolitan area, community network, and across other geographic areas. A node device 115 may also function to route data from one node to another within the mesh network. In addition, each node typically has more than one communication link to and/or from other nodes of the network, which provides for redundant communication links and a reliable communication system.

The wireless mesh network 110 may include various node devices 115 implemented for wireless communication utilizing a data packet routing protocol. The wireless mesh network 110 may also be implemented for data communication with other networks that are communicatively linked to the mesh network 110, such as with another wireless network, wired network, wide-area-network (WAN), and the like.

In the wireless mesh network 110, communication links 120 may be formed between the various nodes 115 of the network. The data packets for wireless communications in the network may be forwarded or routed from a source node (e.g., transmitting device) to a destination node (e.g., receiving device) via intermediate node(s), which are commonly referred to as "hops" in a multi-hop wireless mesh network.

In one configuration, wireless communication device 105 may be in proximity of the mesh network 110. As previously mentioned, the mesh network 110 may include a plurality of nodes 115, which may be wireless communication devices. As shown in FIG. 1, the mesh network 110 is a partial mesh network, with connections or communication links 120 established between the nodes 115-a through 115-i such that each of the nodes may communicate with all of the other nodes of the mesh network 110, some directly and some indirectly. In one configuration, nodes 115 of the mesh network 110 may be referred to herein as member devices and/or advertiser devices. In general: a node that is a source of a particular service may be referred to as a provider; a node that uses a particular service may be referred to as a subscriber; and, a node that advertises the service on behalf of the provider may be referred to as a proxy.

The mesh network 110 may be connected to an external network 125, such as the Internet, by one or more of the member devices (e.g., device 115-i in this example) establishing a connection or communication link 120 with the external network 125. Although not shown, the device 115-i may establish its connection with a base station that has access to the external network 125.

The separate wireless communication device 105 may be referred to as a seeker device. The device 105 may "seek" to join the existing mesh network 110 to obtain one or more services that are provided by the member devices 115 of the mesh network 110. The member devices 115 may be referred to as advertisers, which may broadcast (advertise) the service(s) that the mesh network 110 provides. The seeker device 105 may find the desired service(s) (as well as the advertiser device(s) 115 and the existing mesh network 110) via the broadcast. The device 105 may then join the existing mesh network 110 to obtain the desired service(s).

The seeker device 105 and the member devices 115 may be dispersed throughout the mesh network 100, and each device may be stationary or mobile. A seeker device 105 and the member devices 115 may also be referred to by those skilled in the art as mobile stations, subscriber stations, mobile units, subscriber units, wireless units, remote units, mobile devices, wireless devices, wireless communications devices, remote devices, mobile subscriber stations, access terminals, mobile terminals, wireless terminals, remote terminals, handsets, user agents, user equipments, mobile clients, clients, or some other suitable terminology. A seeker device 105 and a member device 115 may be a cellular phone, a personal digital assistant (PDA), a wireless modem, a wireless communication device, a handheld device, a tablet computer, a laptop computer, a cordless phone, a wireless local loop (WLL) station, or the like.

As described further below, the wireless communication device 105 may perform a simplified peering process with the identified device, such as member device 115-a. If multiple devices 115 have been identified by the wireless communication device 105, the simplified peering process may be performed with only one of the identified devices 115. Thus, as described herein, the wireless communication device 105 performs only a single authentication procedure for peering with and joining the entire mesh network 110. Upon successfully completing the single authentication procedure, the wireless communication device 105 joins the existing mesh network 110 and becomes a member device. No additional authentication procedures, such as with another member device of the existing mesh network, are needed.

Figure 2A:
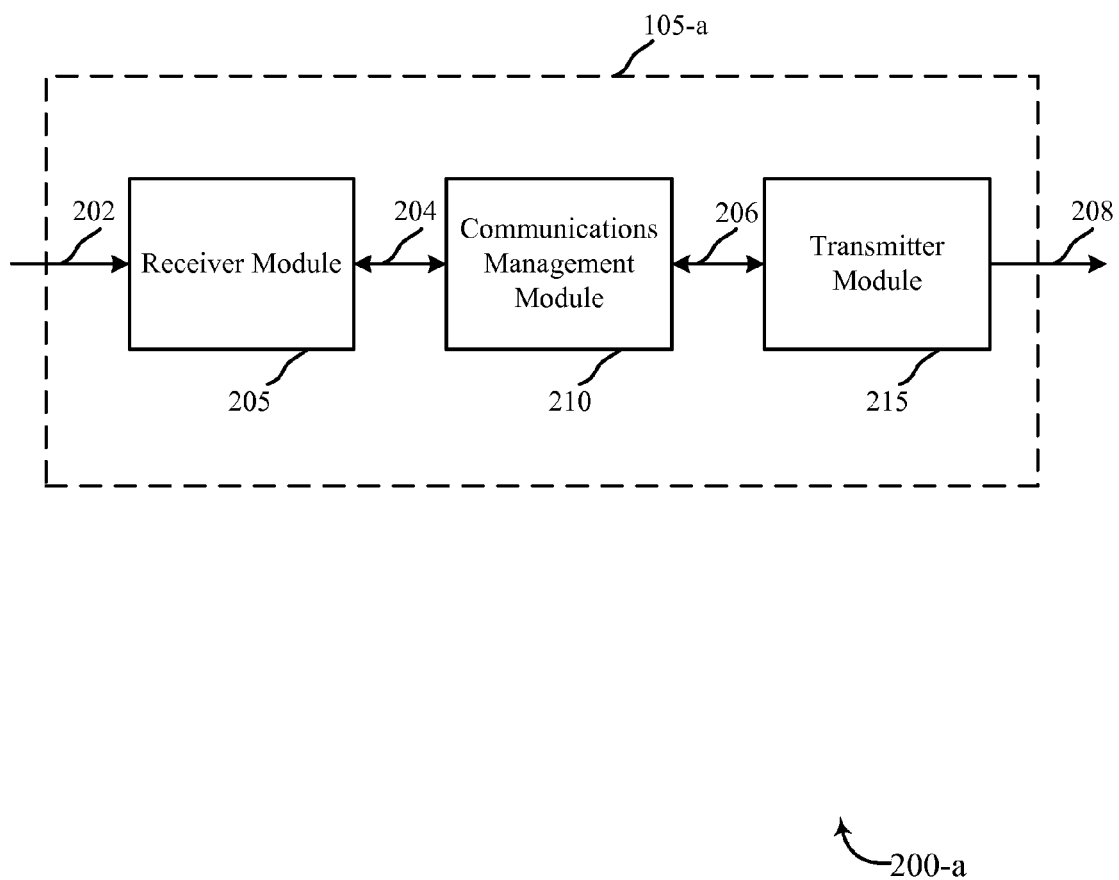
FIG. 2A is a block diagram illustrating an example of a wireless communication device in accordance with various embodiments.

Referring now to FIG. 2A, a block diagram 200-a illustrates a seeker device 105-a in accordance with various embodiments. The seeker device 105-a may be an example of one or more aspects of the wireless communication device 105 described with reference to FIG. 1. The seeker device 105-a also may be an example of one or more aspects of the wireless communication devices 115 described with reference to FIG. 1 (e.g., being capable of cooperating with the wireless communication device 105 to perform the single authentication procedure). The device 105-a may also be a processor. The device 105-a may include a receiver module 205, a communications management module 210, and a transmitter module 215. Each of these components may be in communication with each other.

The components of the device 105-a may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The transmitter module 215 may send communications via signals 208 from the seeker device 105-a to other devices, such as the member device 115-a of the mesh network 110 shown in FIG. 1. Sending such communications may include messages for executing the single authentication procedure. Further, the transmitter module 215 may send communications by transmitting direct (addressed) communications to the member device 115-a once the seeker device 105-a has discovered/identified the member device 115-a. The communications management module 210 may manage such communications sent by the seeker device 105-a.

The receiver module 205 may receive communications via signals 202 from the member device 115-a as part of the single authentication procedure. The receiver module 205 may receive messages for the authentication procedure via directed (addressed) messages transmitted from the member device 115-a. The communications management module 210 may manage such communications received by the seeker device 105-a via signal(s) 204 (e.g., control and/or data). Additionally, upon joining the existing mesh network 110, the communications management module 210 may establish connections with one or more of the member devices 115 of the mesh network 110 and may manage via signal(s) 206 (e.g., control and/or data) communications via such connections. Further details regarding the communications management module 210 will be described below.

Figure 2B:
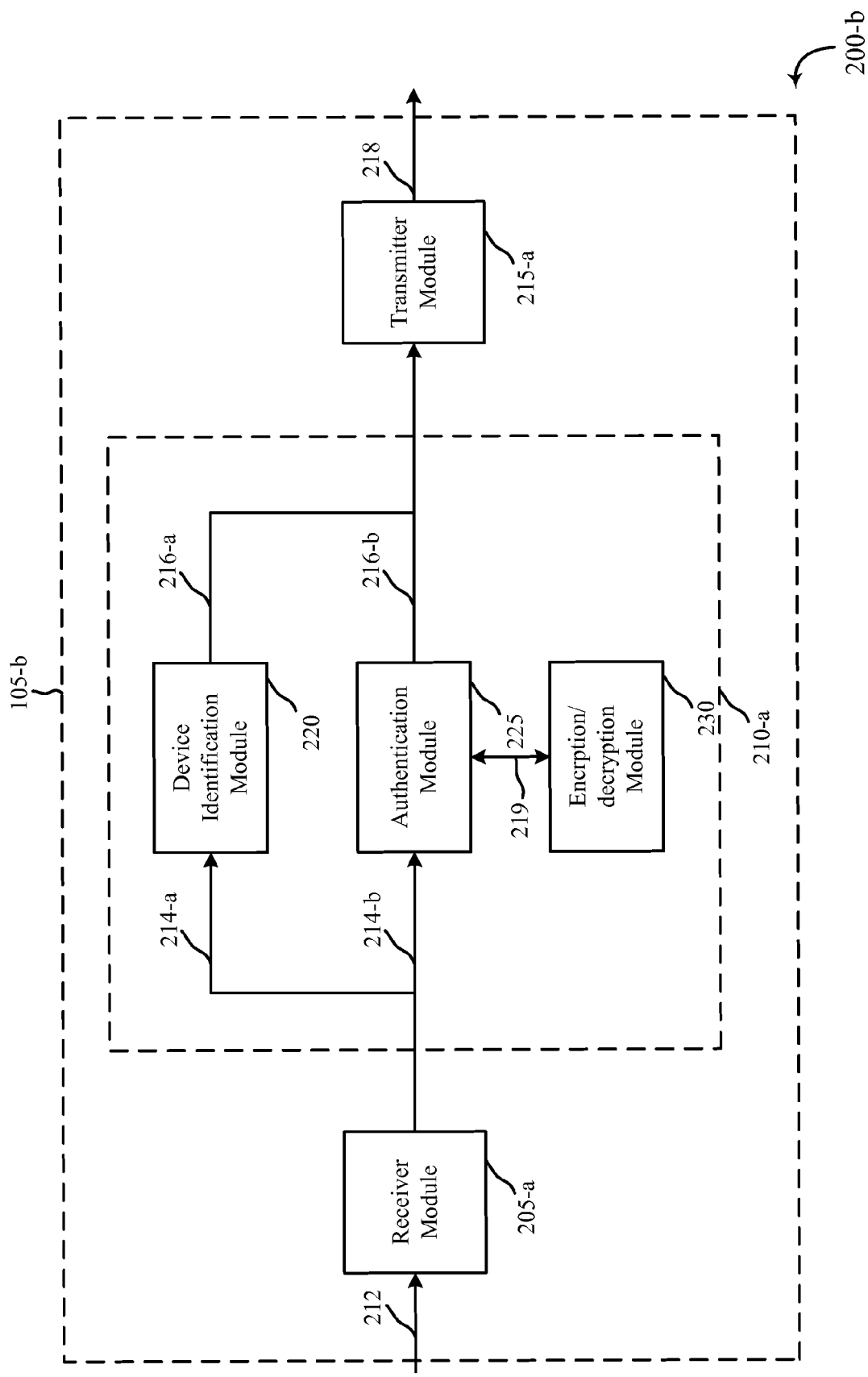
FIG. 2B is a block diagram illustrating a further embodiment of the wireless communication device.

FIG. 2B is a block diagram 200-b illustrating a seeker device 105-b in accordance with various embodiments. The seeker device 105-b may be an example of one or more aspects of the wireless communication device 105, as well as the member devices 115, described with reference to FIGS. 1 and/or 2A. The device 105-b may also be a processor. The device 105-b may include a receiver module 205-a, a communications management module 210-a, and a transmitter module 215-a. Each of these components may be in communication with each other.

The components of the device 105-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The receiver module 205-a and the transmitter module 215-a may be configured to perform operations (e.g., via signals 212 and 218, respectively) as previously described with reference to FIG. 2A. The communications management module 210-a may include a device identification module 220, an authentication module 225, and an encryption/decryption module 230.

The communications management module 210-a may be configured to perform the various functions described above with respect to FIG. 2A. In this example, the communications management module 210-a may manage (via internal signals (not shown)) a discovery/identification process to identify the mesh network 110 providing one or more services that the seeker device 105-b desires. The seeker device 105-b or the communications management module 210-a may include a processor for performing such functionality.

The device identification module 220 may be configured to perform various operations, such as providing data to the transmitter module 215-a via signals 216-a and obtaining data from the receiver module 205-a via signals 214-a, in order to discover or otherwise become aware of the other device(s) that provide a desired service. As a result, the device identification module 220 may facilitate discovering the member device 115-a by cooperating with the communications management module 210-a (or other components thereof), the receiver module 205-a and the transmitter module 215-a in carrying out its operations.

The communications management module 210-a may manage (via internal signals (not shown)) an authentication procedure to allow the seeker device 105-b to join the mesh network 110. The seeker device 105-b or the communications management module 210-a may include a processor for performing such functionality.

The authentication module 225 may be configured to execute various operations to participate in the single authentication procedure as described herein. In some embodiments, the authentication module 225 may generate and provide messages to the transmitter module 215-a, via signals 216-b, to be transmitted via signals 218 to the member device 115-a participating in the single authentication procedure. Further, the authentication module 225 may be configured to process messages obtained via signals 214-b from the receiver module 205-a, which are received via signals 212 from the member device 115-a as part of the authentication procedure. Thus, the authentication module 225 may cooperate with the communications management module 210-a (or other components thereof), the receiver module 205-a and the transmitter module 215-a in carrying out its operations.

The communications management module 210-a may manage (via internal signals (not shown)) security for the seeker device 105-b. The seeker device 105-b or the communications management module 210-a may include a processor for performing such functionality.

The encryption/decryption module 230 may be configured to perform security operations including encryption and decryption operations. With respect to the single authentication procedure, which should be secure, the encryption/decryption module 230 may, via signals 219 exchanged with the authentication module 225, encrypt the messages generated by the authentication module 225 and may decrypt the messages received from the member device 115-a.

The encryption/decryption module 230 also may be configured to perform security operations for communications between the seeker device 105-b and one or more of the member devices 115 once the device 105-b has joined the mesh network. The communications within the mesh network 110 should be secure. Thus, the encryption/decryption module 230 may encrypt messages to be transmitted from the device 105-b and may decrypt messages received from other member devices 115 as part of communications within the mesh network 110. Thus, the encryption/decryption module 230 may cooperate with the communications management module 210-a (or other components thereof), the receiver module 205-a and the transmitter module 215-a in carrying out such operations.

Figure 2C:
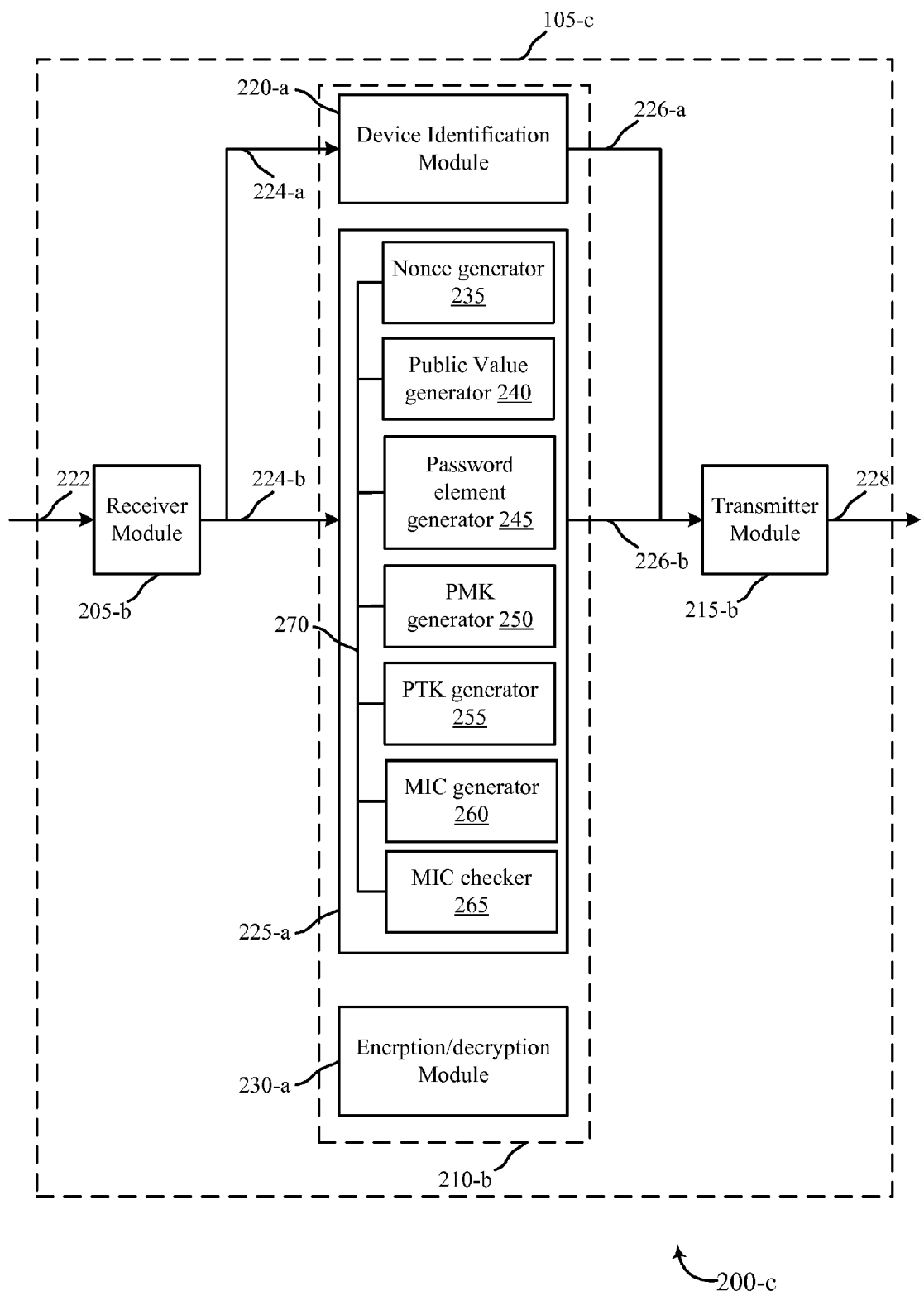
FIG. 2C is a block diagram illustrating another embodiment of the wireless communication device.

FIG. 2C is a block diagram 200-c illustrating a seeker device 105-c in accordance with various embodiments. The seeker device 105-c may be an example of one or more aspects of the wireless communication device 105, as well as the member devices 115, described with reference to FIGS. 1, 2A and/or 2B. The device 105-c may also be a processor. The device 105-c may include a receiver module 205-b, a communications management module 210-b, and a transmitter module 215-b. Each of these components may be in communication with each other.

The components of the device 105-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The receiver module 205-b and the transmitter module 215-b may be configured to perform operations (e.g., via signals 222 and 228, respectively) as previously described with reference to FIGS. 2A and/or 2B. The communications management module 210-b may include a device identification module 220-a, an authentication module 225-a, and an encryption/decryption module 230-a. The device identification module 220-a and the encryption/decryption module 230-a may be configured to perform operations as previously described with reference to FIGS. 2A and/or 2B.

The communications management module 210-b may be configured to perform the various operations/functions described above with respect to FIGS. 2A and/or 2B. As above, the communications management module 210-b may manage (via internal signals (not shown)) a discovery/identification process for one or more services that the seeker device 105-c desires. Further, the seeker device 105-c or the communications management module 210-b may include a processor for performing such functionality. The device identification module 220-a may be configured to perform operations described above with respect to FIGS. 2A and/or 2B (e.g., via signals 224-a and 226-a).

The communications management module 210-b may manage (via internal signals (not shown)) an authentication procedure to allow the seeker device 105-c to join the mesh network 110. The seeker device 105-c or the communications management module 210-a may include a processor for performing such functionality.

The authentication module 225-a may be configured to perform operations described above with respect to FIGS. 2A and/or 2B (e.g., via signals 224-b and 226-b). The authentication module 225-a may include a nonce generator 235, a public value generator 240, a password element generator 245, a PMK (pairwise master key) generator 250, a PTK (pairwise transient key) generator 255, a MIC (message integrity code) generator 260, and/or a MIC checker 265. Each of these modules may be interconnected via a bus 270 carrying signals therebetween and may be controlled by the authentication module 225-a. The authentication module 225-a thus may provide additional functionality as described below.

In some embodiments, the single authentication procedure may involve a four-way handshake. It is assumed that before the four-way handshake begins, the wireless communication device 105-c and the member device 115-a have found each other and agreed to proceed with the authentication procedure. Thus, the four-way handshake enables the wireless communication device 105-c to join the existing network via the single authentication (peering) procedure. The four-way handshake provides authentication and association as described further below.

According to this approach, the seeker device 105-c and the member device 115-a have a common secret password.

For example, the seeker device 105-c and the member device 115-a may be provisioned with a common password. The password element generator 245 may generate a password element (P) using the common password. The nonce generator 235 may generate a random nonce (an arbitrary number used only once) Na. Using the nonce Na, the public value generator 240 generates its Diffie-Hellman (DH) public value $P^{Na}$. In a first message, the seeker device 105-c sends the public value $P^{Na}$ to the member device 115-a.

The member device 115-a generates its own random nonce and generates its DH public value $P^{Nb}$. In a second message, the seeker device 105-c receives the public value $P^{Nb}$ from the member device 115-a. At this point, the PMK generator 250 generates a pairwise master key (PMK) for the seeker device 105-a. The member device 115-a also generates a pairwise master key (PMK).

The PTK generator 255 generates a pairwise transient key (PTK) using the PMK generated by the PMK generator 250. The seeker device 105-c then sends an association request message (third message) to the member device 115-a. In some embodiments, the seeker device 105-c may send an IP address request along with the association request message. The MIC generator 260 creates a message integrity code (MIC) of the association request using the PTK. The seeker device 105-c includes the generated MIC in the association request.

Upon receipt of the association request, the member device 115-a attempts to verify the received MIC. If the MIC is correct (verified), the device 105-c receives an association response message (fourth message) with a common group key (which may be encrypted using the established PTK) from the member device 115-a. In some embodiments, the device 105-c may receive a response to the IP address request (e.g., providing an IP address for the device 105-c) along with the association response message. The member device 115-a creates a MIC of the association response using the PTK and includes its MIC in the association response message.

Each of the MICs is used to confirm that both devices have the same password and derive the same keys (PMK and PTK) as a result of DH key exchange. Because the PMK is a result of DH key exchange, no further DH is necessary to derive the PTK. No nonce exchange may be needed for PTK derivation; however, nonce exchange may be used for key confirmation during association (e.g., the association request message and/or the association response message).

Authentication and key derivation may be based on SAE (simultaneous authentication of equals) as described in the IEEE 802.11 standard, for example. A simplified version thereof is described below.

The seeker device 105-c (and the member device 115-a) derive:

$$P=F1(pw,MAC\text{-}A,MAC\text{-}STA\text{-}B) \qquad \text{Eq. 1}$$

where P is the password element (PWE). MAC-A is the media access control (MAC) address of the seeker device 105-c, MAC-B is the MAC address of the member device 115-a, and F1 is a function that derives P as described in IEEE 802.11.

According to this approach, the seeker device 105-c randomly picks Na (i.e., ANonce), computes $P^{Na}$, and sends $P^{Na}$ to the member device 115-a (first message). The member device 115-a randomly picks Nb (i.e., BNonce), and computes keyseedAB=$P^{NaNb}$. Then, the member device 115-a computes $P^{Nb}$ and sends $P^{Nb}$ to the seeker device 105-c (second message). The seeker device 105-c computes keyseedAB=$P^{NaNb}$.

Using the keyseedAB, the following may be derived:

$$KCK\|PMK=F2(keyseedAB) \qquad \text{Eq. 2}$$

where F2 is a function that derives a key confirmation key (KCK) and PMK. Further details are provided in IEEE 802.11. The KCK is used for MIC generation to provide authenticity of the authentication messages. Because KCK PMK cannot be derived by the device 105-c for the first message without receiving the second message (authentication response), only the second message carries the MIC. However, both devices derive KCK and PMK to generate PTK.

The communications management module 210-b may manage (via internal signals (not shown)) security for the seeker device 105-c. The seeker device 105-c or the communications management module 210-b may include a processor for performing such functionality.

The encryption/decryption module 230-a may be configured to perform security operations for communications between the seeker device 105-c and one or more of the member devices 115 once the device 105-c has joined the mesh network. The communications within the mesh network 110 should be secure. Thus, the encryption/decryption module 230-a may encrypt messages to be transmitted from the device 105-c and may decrypt messages received from other member devices 115 as part of communications within the mesh network 110. Thus, the encryption/decryption module 230-a may cooperate with the communications management module 210-b (or other components thereof), the receiver module 205-b and the transmitter module 215-b in carrying out such operations.

Figure 2D:
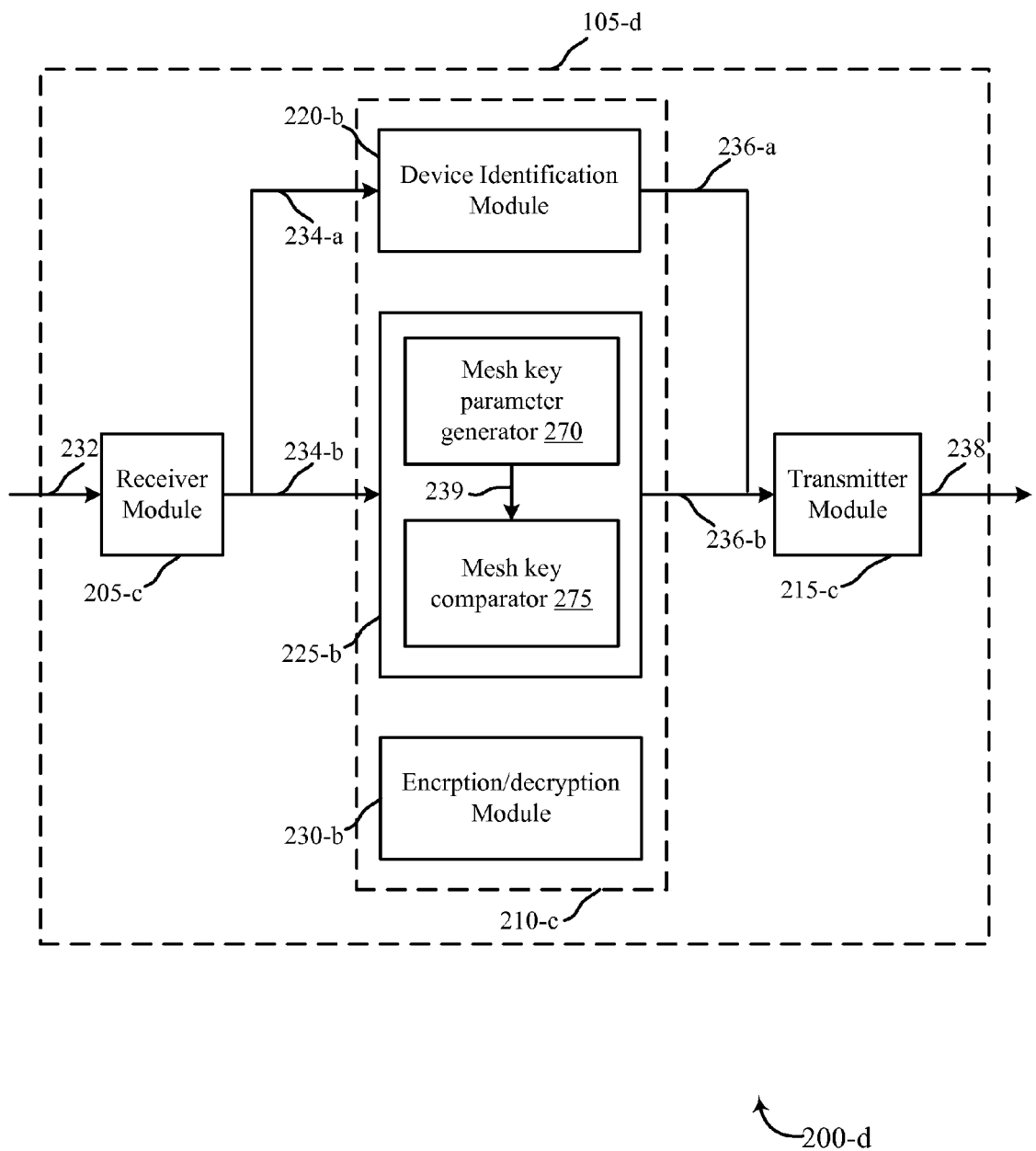
FIG. 2D is a block diagram illustrating yet another embodiment of the wireless communication device.

FIG. 2D is a block diagram 200-d illustrating a seeker device 105-d in accordance with various embodiments. The seeker device 105-d may be an example of one or more aspects of the wireless communication device 105, as well as the member devices 115, described with reference to FIGS. 1, 2A, 2B and/or 2C. The seeker device 105-d may also be a processor. The device 105-d may include a receiver module 205-c, a communications management module 210-c, and a transmitter module 215-c. Each of these components may be in communication with each other.

The components of the seeker device 105-d may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The receiver module 205-c and the transmitter module 215-c may be configured to perform operations (e.g., via signals 232 and 238, respectively) as previously described with reference to FIGS. 2A, 2B and/or 2C. The communications management module 210-c may include a device identification module 220-b, an authentication module 225-b, and an encryption/decryption module 230-b. The device identification module 220-b and the encryption/decryption module 230-b may be configured to perform operations as previously described with reference to FIGS. 2A, 2B and/or 2C.

The communications management module 210-*c* may be configured to perform the various operations/functions described above with respect to FIGS. 2A, 2B and/or 2C. As above, the communications management module 210-*c* may manage (via internal signals (not shown)) a discovery process for one or more services that the seeker device 105-*d* desires. Further, the seeker device 105-*d* or the communications management module 210-*c* may include a processor for performing such functionality. The device identification module 220-*b* may be configured to perform operations described above with respect to FIGS. 2A, 2B and/or 2C (e.g., via signals 234-*a* and 236-*a*).

The authentication module 225-*b* may be configured to perform operations described above with respect to FIGS. 2A 2B and/or 2C (e.g., via signals 234-*b* and 236-*b*). The authentication module 225-*b* may include a mesh key parameter generator 270 and/or a mesh key comparator 275. The authentication module 225-*b* may provide additional functionality as described below.

The possibility of fragmentation in mesh networking (creation of separate mesh networks for the same service by multiple provider devices) may be addressed by having devices configured as the device seeker 105-*d*. While the mesh key parameter generator 270 and the mesh key comparator 275 are shown as part of the authentication module 225-*b*, these components may be part of their own module or separate modules. It may be that some existing devices already include functionality for performing discovery operations and/or encryption/decryption. Thus, such devices may be modified to include a new module to implement various aspect described herein. As such, the mesh key parameter generator 270 and the mesh key comparator 275 are shown as part of the authentication module 225-*b* as one example.

The mesh key parameter generator 270 and the mesh key comparator 275 may be configured to enable the device 105-*d* to recognize the existence of multiple mesh networks that are providing the same service(s). Accordingly, the mesh key parameter generator 270 and the mesh key comparator 275 may be employed to enable or facilitate merger (defragmentation) of such duplicate mesh networks.

A mesh key may be included in discovery advertisements (e.g., service discovery messages on a NAN (neighbor awareness network) channel) broadcast or otherwise transmitted from devices that are members of an existing mesh network. Additional parameters that may be included in the discovery advertisements may include a mesh ID identifying the particular mesh network, a mesh channel identifying the channel to be used for communicating with the particular mesh network, and a page window offset.

The mesh key parameter generator 270 of the seeker device 105-*d* may generate a mesh key, as well as other parameters (such as above) for a particular mesh network the device 105-*d* has joined. The mesh key comparator 275 may compare the mesh key included in a discovery advertisement received by the receiver module 205-*c* via signal 232, and provided to the mesh key comparator 275 via signal 234-*b*, with the mesh key generated by the mesh key parameter generator 270, and provided to the mesh key comparator via signal 239. If the comparison determines that there is a mismatch between the two mesh keys, the seeker device 105-*d* may determine that the device that sent the discovery advertisement is a member of a different mesh network providing the same service(s).

In response to such a determination, the seeker device 105-*d* may decide to leave (e.g., disassociate from) its current mesh network providing the same service(s) and join the different mesh network corresponding to the received advertisement. This decision may be based on any suitable criterion or criteria (e.g., a priori). If the other member devices of the current mesh network of the seeker device 105-*d* are similarly configured and apply the same criterion/criteria, then all of the devices of the current mesh network may eventually decide to leave and join the different mesh network. Alternatively, in response to advertisements from members of the current mesh network, all of the member devices of the different mesh network may eventually decide to leave and join the current mesh network of the seeker device 105-*d*. In either case, the fragmentation (number of duplicate mesh networks providing the same service(s)) may be reduced by such merger.

In embodiments employing a common group key, the mesh key may be generated using the common group key, a current nonce and a predetermined text. Over time, the seeker device 105-*d* may receive an update to the current nonce. In such case, an updated mesh key may be generated using the common group key, the update to the current nonce and the predetermined text. Additionally, the device 105-*d* may receive an update to the common group key. In such case, an updated mesh key may be generated using the update to the common group key, the current nonce and the predetermined text.

Figure 2E:
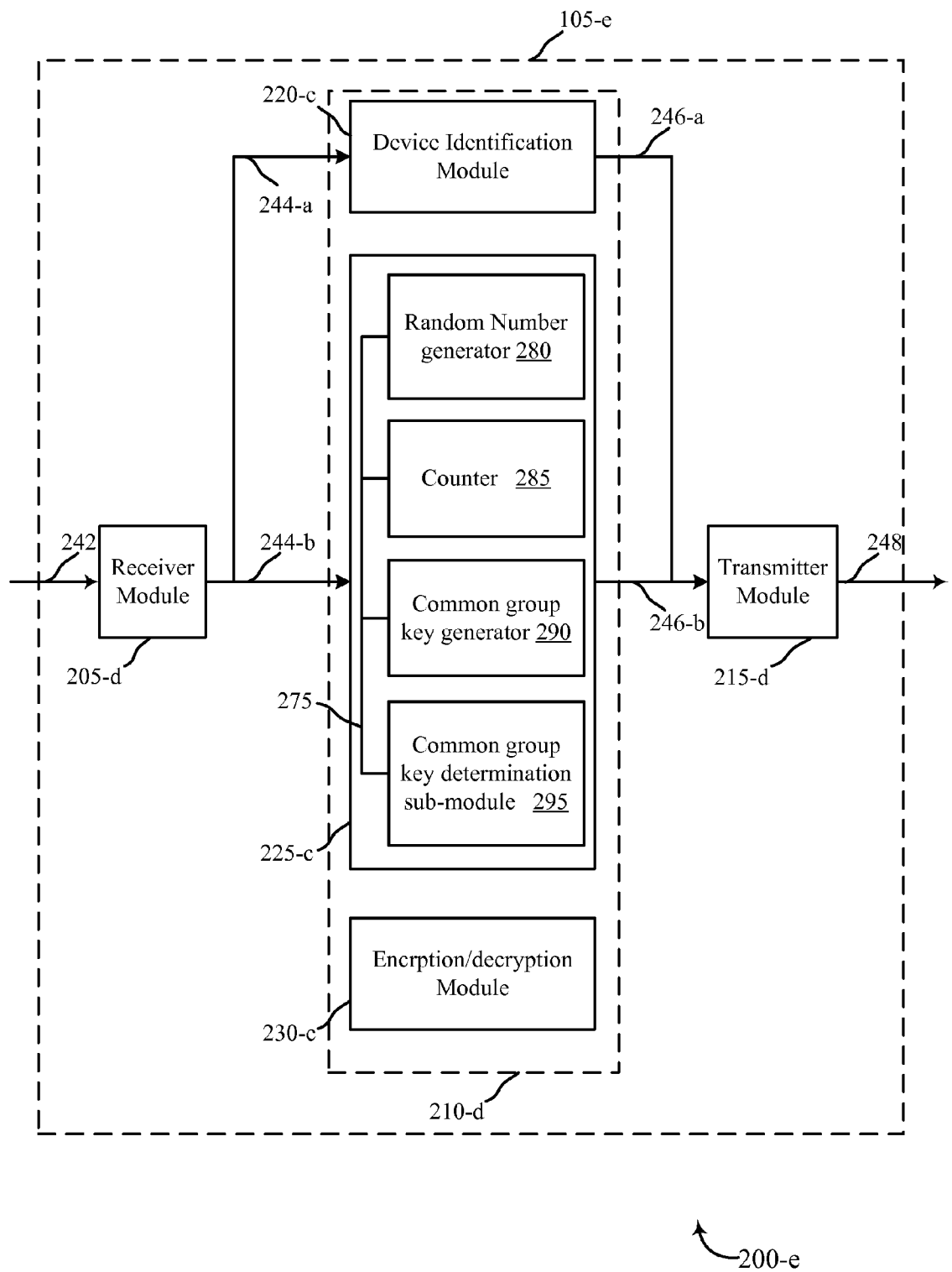
FIG. 2E is a block diagram illustrating sill another embodiment of the wireless communication device.

FIG. 2E is a block diagram 200-*e* illustrating a seeker device 105-*e* in accordance with various embodiments. The seeker device 105-*e* may be an example of one or more aspects of the wireless communication device 105, as well as the member devices 115, described with reference to FIGS. 1, 2A, 2B, 2C and/or 2D. The device 105-*e* may also be a processor. The device 105-*e* may include a receiver module 205-*d*, a communications management module 210-*d*, and a transmitter module 215-*d*. Each of these components may be in communication with each other.

The components of the device 105-*e* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The receiver module 205-*d* and the transmitter module 215-*d* may be configured to perform operations (e.g., via signals 242 and 248, respectively) as previously described with reference to FIGS. 2A, 2B, 2C and/or 2D. The communications management module 210-*d* may include a device identification module 220-*c*, an authentication module 225-*c*, and an encryption/decryption module 230-*c*.

The communications management module 210-*d* may be configured to perform the various operations/functions (e.g., via signals 242, 244, 246 and 248, as well as internal signals (not shown)) described above with respect to FIGS. 2A, 2B, 2C and/or 2D. Further, the seeker device 105-*e* or the communications management module 210-*d* may include a processor for performing such functionality. The device identification module 220-*c* (e.g., via signals 244-*a* and 246-*a*) and the encryption/decryption module 230-*c* (via internal signals (not shown)) also may be configured to perform operations described above with respect to FIGS. 2A, 2B, 2C and/or 2D.

Also, the authentication module 225-*c* may be configured to perform operations described above with respect to FIGS. 2A, 2B, 2C and/or 2D (e.g., via signals 244-*b* and 246-*b*). The authentication module 225-*c* may include a random number generator 280, counter 285, a common group key generator 290, and/or a common group key determination sub-module 295. Each of these modules may be interconnected via a bus 275 carrying signals therebetween and may be controlled by the authentication module 225-*c*. The authentication module 225-*a* thus may provide additional functionality as described below.

As described above, the seeker device 105-*e* may receive a common group key (via signal 224-*b*) as part of the single authentication procedure. The common group key is possessed by all member devices 115 of the existing mesh network 110. Thus, when the seeker device 105-*e* has joined the existing mesh network 110, the device 105-*e* and all of the other member devices 115-*a* through 115-*i* may use the common group key for secure communications within the mesh network 110.

In some embodiments, the common group key may include an expiration time value. This may help to provide increased security for the mesh network 110 (e.g., by reducing the possibility of non-members of the mesh network discovering the common group key by replay attack). Because the common group key will expire, a new common group key (which will also expire at some point in time) should be generated to replace the existing common group key, for example, just prior to its expiration. Thus, management of the common group key for the mesh network 110 is needed to implement this feature. One example of such management is described next.

Prior to reaching the expiration time value of the common group key, the device 105-*e* may initiate a count down from a random number to a predetermined number. Thus, shortly before the expiration time, the random number generator 280 may receive a signal from the authentication module 225-*c* over the bus 275 instructing the random number generator to generate the random number for the count down. The counter 285 may receive the generated random number via the bus 275 and then may perform the count down from the generated random number. When the counter reaches the predetermined number, the authentication module 225-*c* may send an instruction over the bus 275 to cause the common group key generator to generate a new common group key. The device 105-*e* then may send the new common group key in a secure manner to the other member devices 115 via the mesh network 110.

Similarly, the other member devices 115 of the mesh network 110 may initiate a count down from a random number to the predetermined number. Because the starting number for the count down is randomly generated for each individual member device 115, each member device will most likely have a different count down time. The goal may be to have only one new common group key generated by one of the devices of the mesh network 110 and securely distributed to all other devices of the mesh network. Thus, once one of the devices has generated a new common group key, the other devices may quit the process of generating their own new common group key for distribution (e.g., by discontinuing their count downs).

For example, if the countdown time of one or more of the member devices is less than the countdown time of the seeker device 105-*e*, the seeker device 105-*e* will likely receive a new common group key (via signal 242) from one of the member devices 115 before the counter 285 of the device 105-*e* reaches the predetermined number. In such case, upon receiving the new common group key via signal 244-*b*, the authentication module 225-*c* may send an instruction over the bus 275 to cause the counter 285 to discontinue the countdown. Thus, the common group key generator may not be instructed to generate a new common group key. The device 105-*e* may then replace the current common group key with the received new common group key.

However, because differences in propagation times for messages to arrive may exist (e.g., due to delays), the message providing the new common group key from one of the member devices 115 to the device 105-*e* may in fact not be the first new common group key that is generated. In such case, the device 105-*e* may receive another new common group key from a different member device 115. Such receipt of a second (or third, fourth, etc.) new common group key may be limited by requiring that the second (or third, fourth, etc.) new common group key be received within a predetermined time of receiving the first new common group key.

If a second (or third, fourth, etc.) new common group key is received by the seeker device 105-*e* within the predetermined time of the device 105-*e* receiving the first new common group key, the common group key determination sub-module 295 may receive both keys via the bus 275 and determine which of the received new common group keys is valid (and to be used to replace the current common group key). For example, the common group key determination sub-module 295 may make its determination using one or more suppression criterion. The suppression criterion/criteria may be based on one factor or a combination of multiple factors, such as the higher MAC address, seniority in the mesh network 110, etc. of the corresponding generating device. All devices of the mesh network 110 may be configured to apply the same suppression criterion/criteria.

In order for the new common group key to be securely distributed throughout the mesh network 110, the member devices may be configured to employ one or more aspects of the authentication procedure described herein. The member device that has generated a new common group key may notify its neighboring devices (e.g., within a single hop) via a message secured using the current common group key that is soon to expire. Each neighbor device may independently perform authentication with this member device and receive the new common group key upon successful authentication. The common group key that is soon to expire may remain valid at each device of the mesh network 110 even after receiving the new common group key to allow delivery of any traffic employing the soon to expire common group key (e.g., messages, video, etc.) that may still be in transit.

Figure 3:
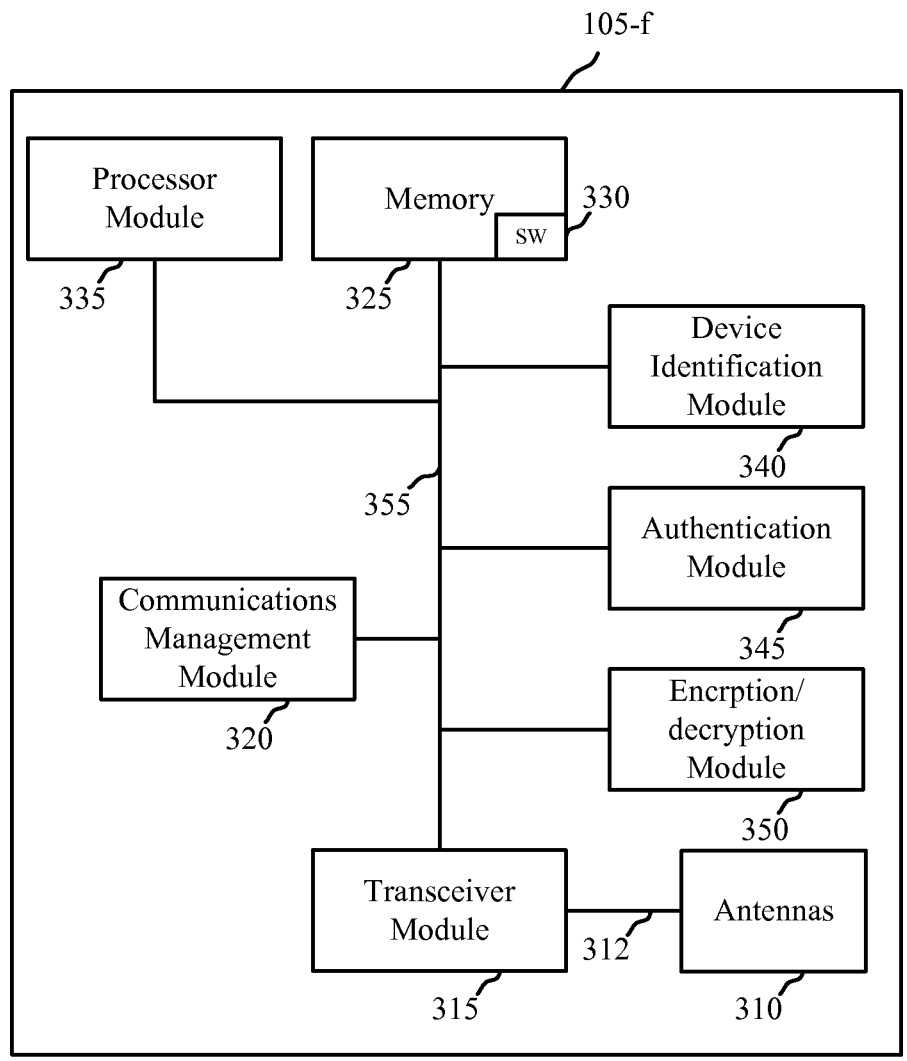
FIG. 3 is a block diagram of one configuration of a wireless communication device.

FIG. 3 is a block diagram 300 illustrating a device 105-*f* according to various embodiments. The device 105-*f* may operate as either a seeker device or as a member device as described herein, depending on actual use of the device 105-*f*. In one configuration, a member device 115 may be referred to as an advertiser device. The seeker device 105-*f* may be configured to participate in a discovery process for obtaining desired services via mesh networking. Thus, the device 105-*f* may be the seeker device 105 and/or the advertiser device 115 of FIGS. 1, 2A, 2B, 2C, 2D, and/or 2E, respectively. The device 105-*f* may have any of various configurations, such as personal computers (e.g., laptop computers, netbook computers, tablet computers, etc.), cellular telephones, PDAs, digital video recorders (DVRs), internet appliances, gaming consoles, e-readers, etc. The device 105-*f* may have an internal power supply (not shown), such as a small battery, to facilitate mobile operation.

In the configuration shown, the device 105-*f* includes one or more antennas 310, a transceiver module 315, a communications management module 320, memory 325, a processor module 335, a device identification module 340, an authentication module 345, and an encryption/decryption module 350, which each may be in communication, directly or indirectly, with each other (e.g., via one or more buses 355). The transceiver module 315 is configured to communicate bi-directionally via signals 312 sent to and received from the antenna(s) 310, as described above. For example, the transceiver module 315 may be configured to communicate bi-directionally with other devices 105 and/or 115 of FIGS. 1, 2A, 2B, 2C, 2D, and/or 2E. The transceiver module 315 may include the receiver module 205 and the transmitter module 215 of FIGS. 2A, 2B, 2C, 2D, and/or 2E, as previously described. In one embodiment, the transceiver module 315 may further include a modem configured to modulate packets and provide the modulated packets to the antenna(s) 310 for transmission, and to demodulate packets received from the antenna(s) 310. While the device 105-*f* may include a single antenna, the device 105-*f* will typically include multiple antennas 310 for multiple links.

The memory 325 may include random access memory (RAM) and read-only memory (ROM). The memory 325 may store computer-readable, computer-executable software code 330 containing instructions that are configured to, when executed, cause the processor module 335 to perform various functions described herein (e.g., identify/determine/obtain audio and/or video streams, graphics resources, and/or rendering instructions, receive, transmit, etc.). Alternatively, the software 330 may not be directly executable by the processor module 335 but be configured to cause the computer (e.g., when compiled and executed) to perform functions described herein.

The processor module 335 may include an intelligent hardware device, e.g., a central processing unit (CPU), a microcontroller, an application specific integrated circuit (ASIC), etc. The processor module 335 may include a speech encoder (not shown) configured to receive audio via a microphone, convert the audio into packets (e.g., 30 ms in length) representative of the received audio, provide the audio packets to the transceiver module 315, and provide indications of whether a user is speaking. Alternatively, an encoder may only provide packets to the transceiver module 315, with the provision or withholding/suppression of the packet itself providing the indication of whether a user is speaking.

The communications management module 320 may be a component of the device 105-*f* in communication with some or all of the other components of the device 105-*f* via the bus 355. Alternatively, functionality of the communications management module 320 may be implemented as a component of the transceiver module 315, as a computer program product, and/or as one or more controller elements of the processor module 335. The communications management module 320 may be an example of one or more aspects of one of the communications management modules 210 described with reference to FIGS. 2A, 2B, 2C, 2D, and/or 2E.

The device identification module 340, the authentication module 345, and the encryption/decryption module 350 may be an example of one or more aspects of one of the respective modules 220, 225 and 230 described with reference to FIGS. 2A, 2B, 2C, 2D, and/or 2E. Thus, these modules may be configured to perform any of the various operations or provide the functionality described herein.

The components of the device 105-*f* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the device 105-*f* as described herein.

Figure 4:
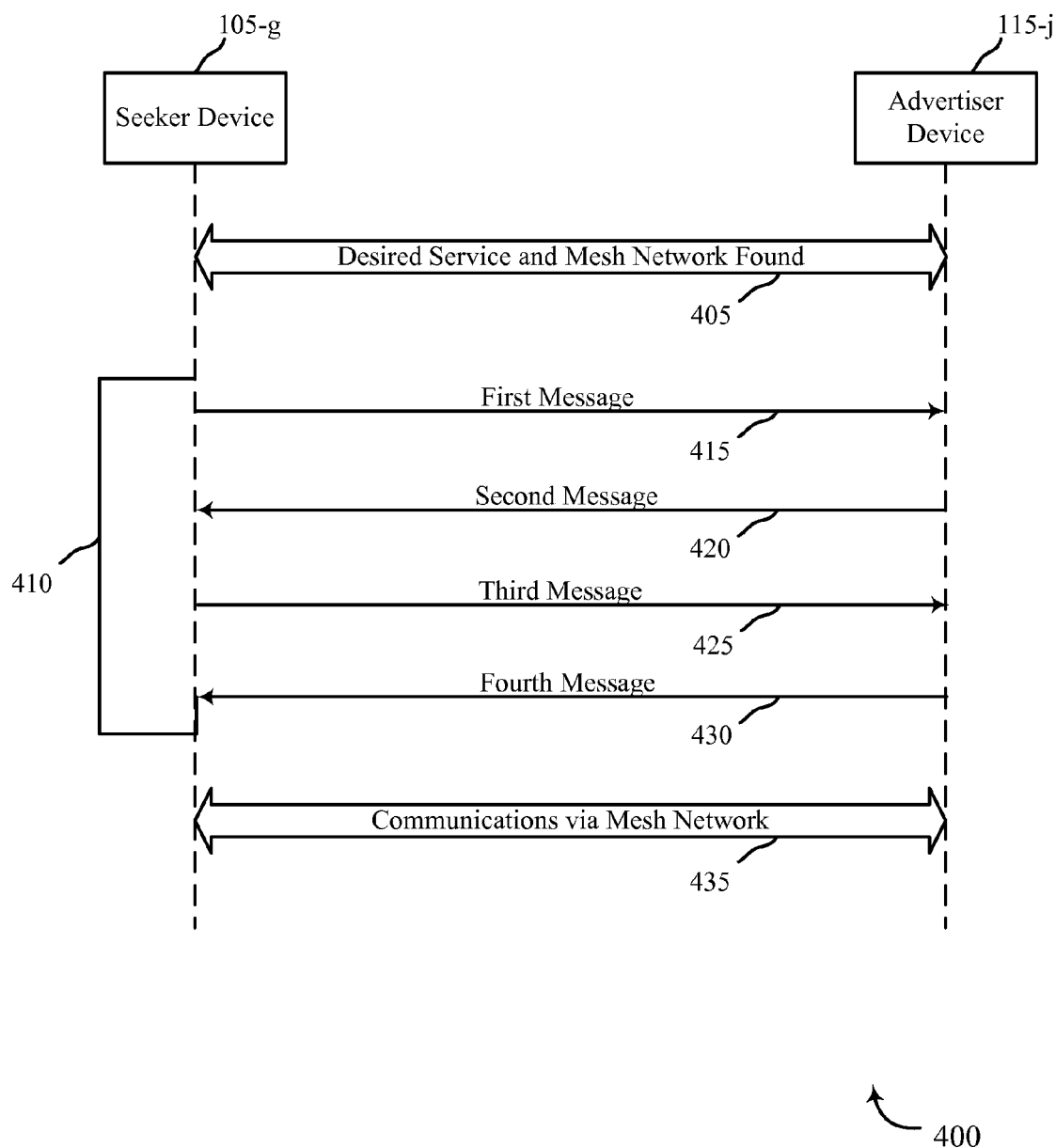
FIG. 4 is a message flow diagram illustrating a flow of communications between a seeker device and an advertiser in accordance with various embodiments.

FIG. 4 is a message flow diagram 400 illustrating one example of communications between a seeker device, such as the wireless communication device 105-*g*, and an advertiser device 115-*a* (i.e., a member device), as described above with respect to FIG. 1. The seeker device 105-*g* also may be an example of the device 105 of FIGS. 2A, 2B, 2C, 2D, 2E and/or 3. The advertiser device 115 may be an example of the device 115 illustrated in FIGS. 2A, 2B, 2C, 2D, 2E and/or 3.

In one configuration, the seeker device 105-*g* and the advertiser device 115-*a* may communicate so that the services desired by the seeker device 105-*g* and the existing mesh network 110 (including the advertiser device 115-*a*) are found, denoted 405 in FIG. 4. The seeker device 105-*g* and the advertiser device 115-*a* may agree to engage in an authentication procedure, denoted 410 in FIG. 4. The authentication procedure 410 may be an implementation of the four-way handshake described herein. Thus, as shown, the authentication procedure 410 may include a first message 415, a second message 420, a third message 425 and a fourth message 430, each of which may involve the aspects of the corresponding messages of the four-way handshake. Upon successful completion of the authentication procedure 410, the seeker device 105-*g* may join the existing mesh network 110 and have possession of the common group key to enable the device 105-*g* to send and receive communications 435 via the mesh network 110. Those skilled in the art will appreciate that numerous messages may be involved in negotiations between the seeker device 105-*g* and the advertiser device 115-*a* to come to agreement for proceeding with the authentication procedure 410, and that 405 is only representative of the communications that may take place in practice.

Figure 5:
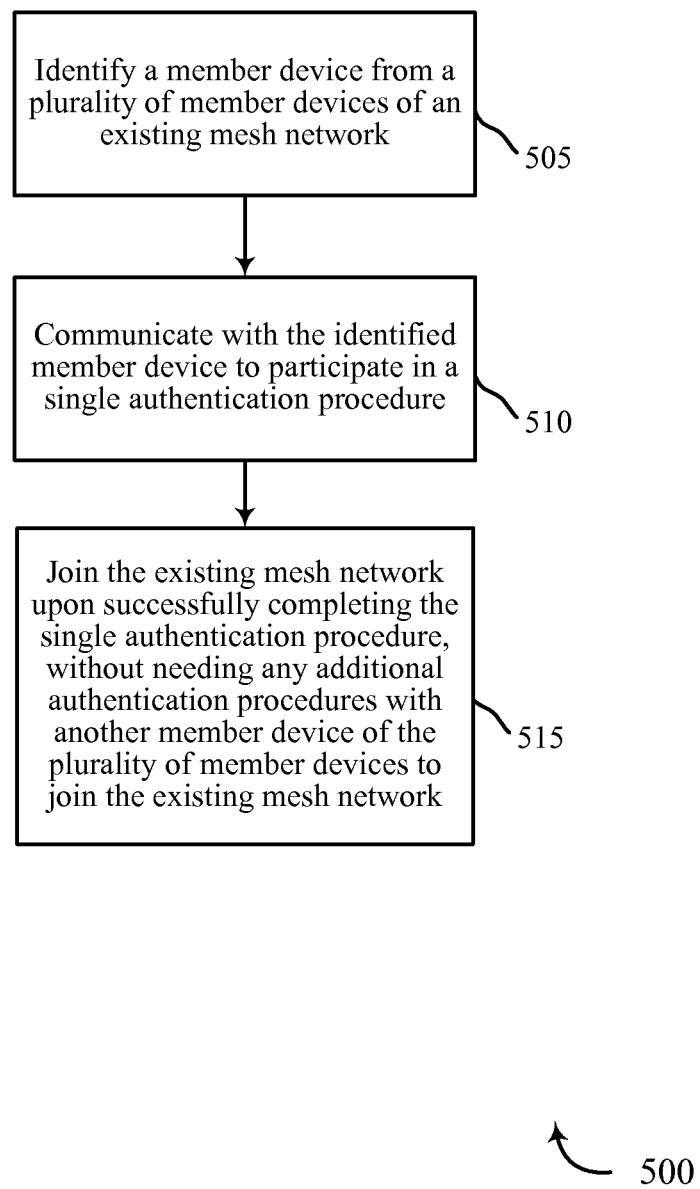
FIG. 5 is a flowchart illustrating an embodiment of a method for communications via a mesh network.

FIG. 5 is a flowchart illustrating an embodiment of a method 500 performed by a seeker device 105 for communications via a mesh network, such as for obtaining one or more services thereby. For clarity, the method 500 is described below with reference to the arrangement 100 shown in FIG. 1, and/or with reference to one of the seeker devices 105 and one of the member devices 115 described with reference to FIGS. 1, 2A, 2B, 2C, 2D, 2E, 3 and/or 4. In one implementation, the communications management module 210 described with reference to FIGS. 2A, 2B, 2C, 2D, 2E, 3 may execute one or more sets of codes to control the functional elements of a seeker device 105 to perform the functions described below.

In one embodiment, at block 505, the device 105 may identify a member device from a plurality of member devices 115 of an existing mesh network 110. The identified member device may be the member device that helped the device 105 find the desired service(s). At block 510, the device 105 may communicate with the identified member device 115-*a* to participate in a single authentication procedure. If the single authentication procedure is successfully completed, the device 105 may join the existing mesh network, without needing any additional authentication procedures with another member device 115 to join the existing mesh network 110.

Therefore, the method 500 may be used to simplify peering for a device to join an existing mesh network. As described above, the number of messages exchanged for peering with a device of the existing mesh network may be reduced. Further, peering with each of the individual member devices of the existing mesh network is not necessary for a device to join. It should be noted that the method 500 is just one implementation and that other implementations are possible.

Figure 6:
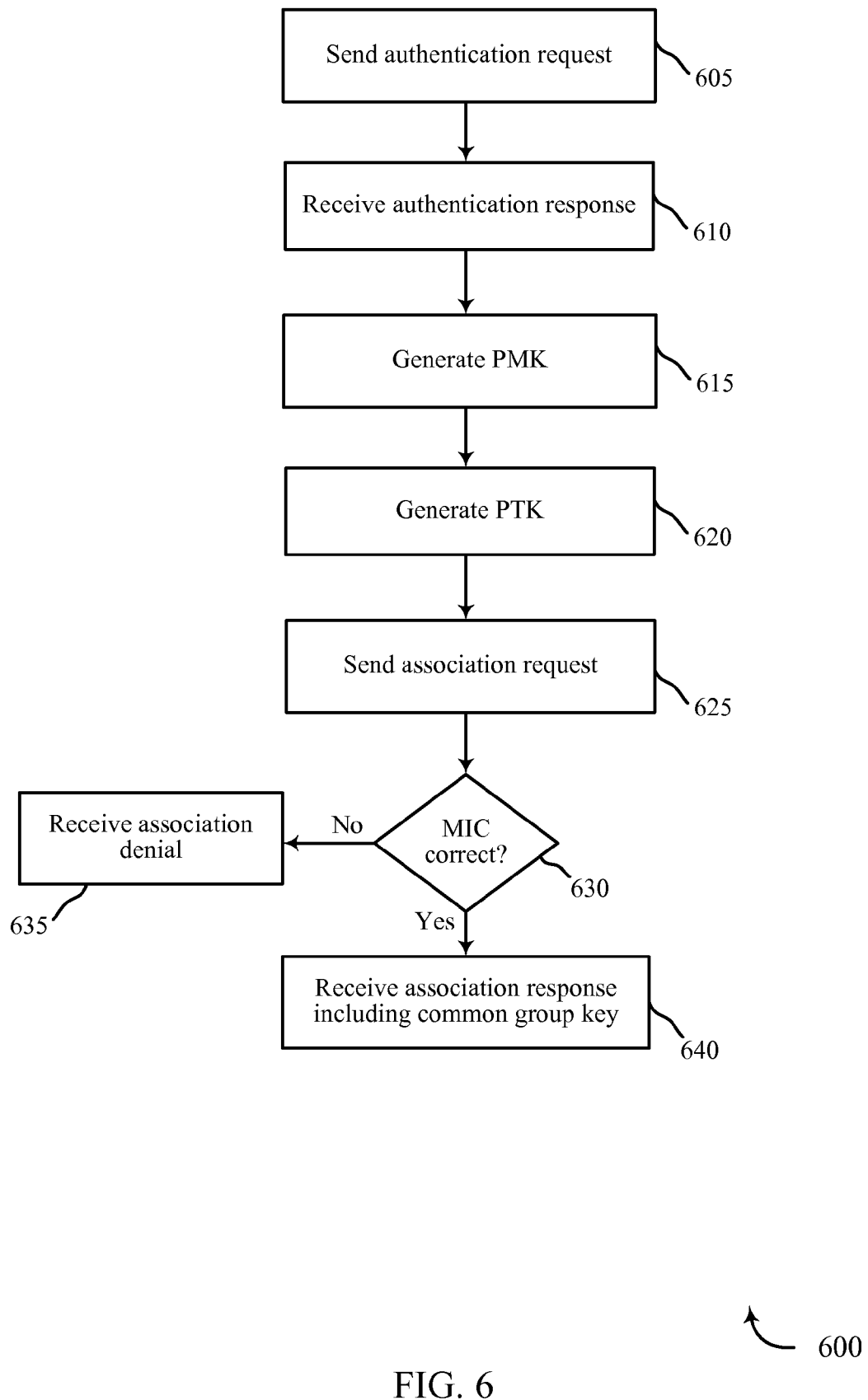
FIG. 6 is a flow chart illustrating a further embodiment of a method for communications via a mesh network.

FIG. 6 is a flowchart illustrating another embodiment of a method 600 performed by a seeker device for communications via a mesh network, such as for obtaining one or more services thereby. For clarity, the method 500 is described below with reference to the arrangement 100 shown in FIG. 1, and/or with reference to one of the seeker devices 105 and/or one of the member devices 115 described with reference to FIGS. 1, 2A, 2B, 2C, 2D, 2E, 3 and/or 4. In one implementation, the communications management module 210 described with reference to FIGS. 2A, 2B, 2C, 2D, 2E, 3 may execute one or more sets of codes to control the functional elements of a seeker device 105 to perform the functions described below.

In one embodiment, at block 605, the device 105 may send an authentication request to a previously identified device 115-*a* of an existing mesh network 110. At block 610, the device 105 may receive an authentication response from a previously identified member device 115-*a*. Next, a PMK may be generated at block 615. Then, a PTK may be generated at block 625. Next, at block 625, the device 105 may send an association request to the member device 115-*a*. As described above, the association request may include a MIC generated by the device 105. If the MIC is not correct at block 630 (e.g., does not match a MIC generated by the member device 115 as part of the authentication procedure), the method 600 may continue to block 635, where the device 105 may receive an association denial message. Thus, if the MIC is not correct, the device 105 may not be allowed to join the existing mesh network 110.

On the other hand, if the MIC generated by the device 105 is correct (e.g., matches the MIC generated by the member device 115), the method 600 may jump to block 640, where the device 105 may receive an association response including a common group key. Thus, if the MIC is correct, the device 105 may join the existing mesh network 110 without peering or performing any additional authentication with other member devices of the mesh network 110.

Therefore, the method 600 may be used to simplify peering for a device to join an existing mesh network. It should be noted that the method 600 is just one implementation and that other implementations are possible.

Figure 7:
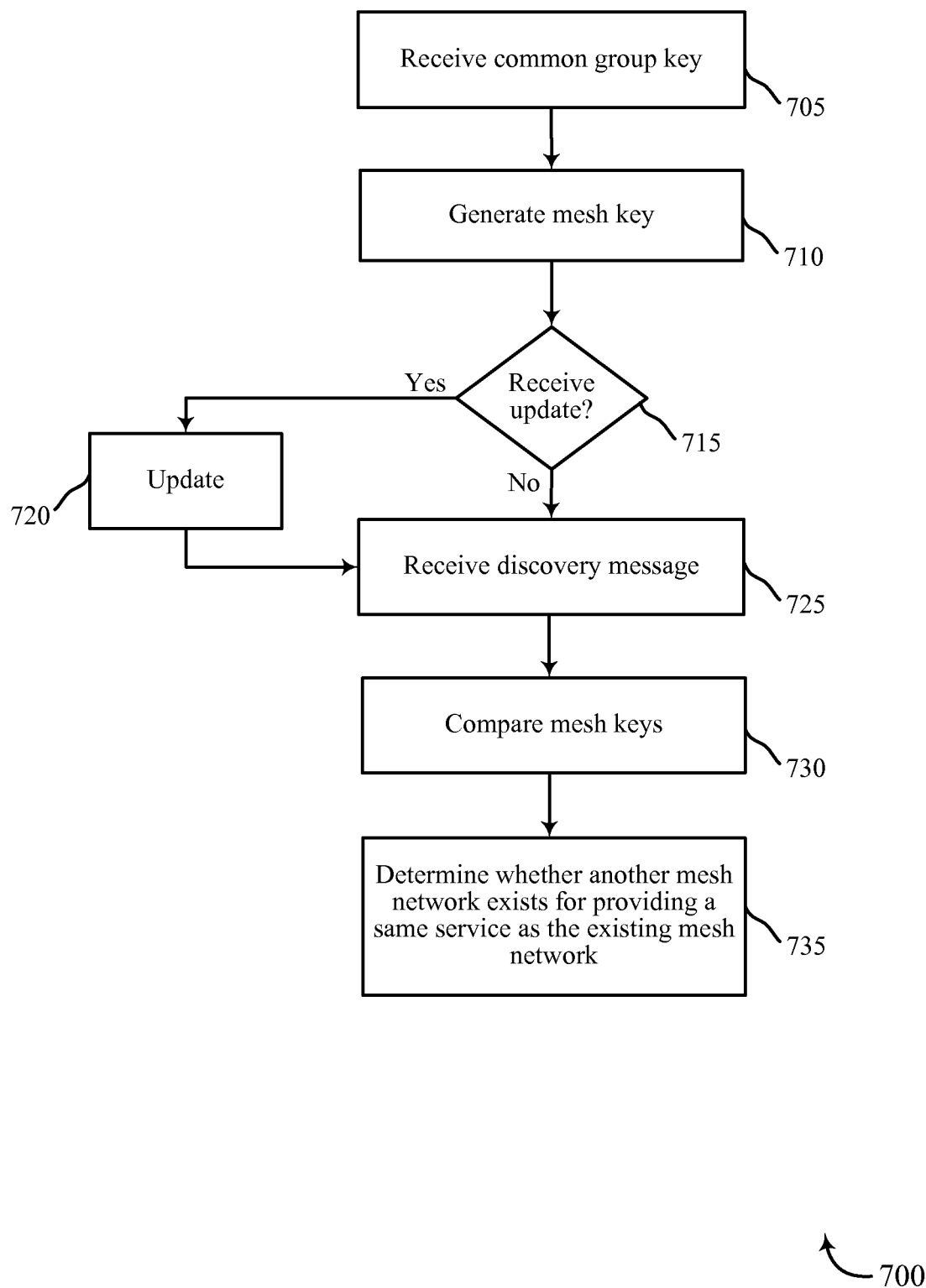
FIG. 7 is a flow chart illustrating another embodiment of a method for communications via a mesh network.

FIG. 7 is a flowchart illustrating an embodiment of a method 700 performed by a seeker device for communications via a mesh network, such as for obtaining one or more services thereby. For clarity, the method 700 is described below with reference to the arrangement 100 shown in FIG. 1, and/or with reference to one of the seeker devices 105 and/or one of the member devices 115 described with reference to FIGS. 1, 2A, 2B, 2C, 2D, 2E, 3 and/or 4. In one implementation, the communications management module 210 described with reference to FIGS. 2A, 2B, 2C, 2D, 2E, 3 may execute one or more sets of codes to control the functional elements of a seeker device 105 to perform the functions described below.

In one embodiment, at block 705, the device 105 may receive a common group key. At block 710, the device 105 may generate a mesh key, for example using the common group key, a current nonce and a predetermined text. If the device 105 receives an update of information at block 715, the method 700 may continue to block 720, where the device 105 may perform an update using the update information. In some embodiments, the update information received may include an update to the current nonce. In such case, the device 105 may generate an updated mesh key using the common group key, the update to the current nonce and the predetermined text. Alternatively or additionally, the update information received may include an update to the common group key. In such case, the device 105 may generate an updated mesh key using the update to the common group key, the current nonce and the predetermined text. It should be understood that the operations at blocks 715 and 720 are optional and may not be included for a particular implementation.

After the device 105 completes the update (when blocks 715 and 720 are included), the method may continue to block 725 (directly from block 710 when blocks 715 and 720 are not included). Also, if the device 105 does not receive an update of information at block 715, the method 700 may jump to block 725. At block 725, the device 105 may receive a discovery message including a mesh key from a neighboring device (e.g., a device within range). Next, at block 730, the device 105 may compare the generated mesh key with the mesh key included in the discovery message. Then, based on a result of the comparison, the device 105 may determine whether another mesh network exists for providing a same service as the existing mesh network. For example, the device 105 may determine that the neighboring device is part of a different mesh network that provides one or more services that the existing mesh network 110 (of which the device 105 is a member) provides.

As described above, based on such a determination, the device 105 may leave (e.g., disassociate from) its current mesh network and join the different mesh network. As discussed above, the may have an effect (over time) of decreasing fragmentation by such a merger. Therefore, the method 700 may be used to address fragmentation in mesh networking. It should be noted that the method 700 is just one implementation and that other implementations are possible.

Figure 8:
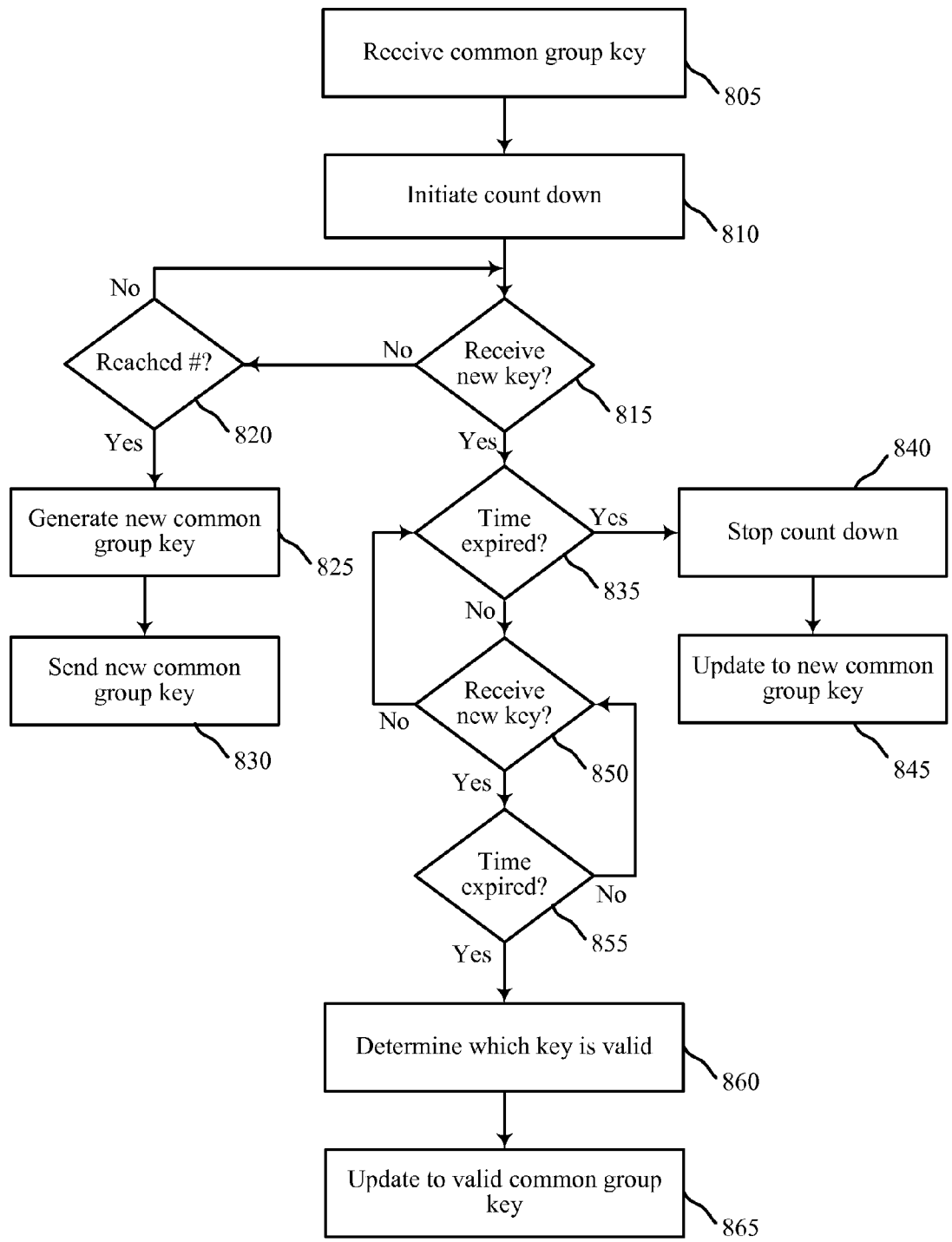
FIG. 8 is a flow chart illustrating yet another embodiment of a method for communications via a mesh network.

FIG. 8 is a flowchart illustrating another embodiment of a method 800 performed by a device for communication via a mesh network, such as for obtaining (or providing) one or more services thereby. For clarity, the method 800 is described below with reference to the arrangement 100 shown in FIG. 1, and/or with reference to one of the seeker devices 105 and/or one of the member devices 115 described with reference to FIGS. 1, 2A, 2B, 2C, 2D, 2E, 3 and/or 4. In one implementation, the communications management module 210 described with reference to FIGS. 2A, 2B, 2C, 2D, 2E, 3 may execute one or more sets of codes to control the functional elements of a seeker device 105 to perform the functions described below.

In one embodiment, at block 805, the device 105 may receive a common group key. In this example, the common group key includes an expiration time value. Thus, at a certain point in time, or after elapse of a certain time interval, the common group key will expire. Next, at block 810, the device 105 may initiate a count down as the expiration of the common group key draws near. As described above, the count down may be from a random number to a predetermined number.

At block 815, the device may determine whether it has received a new common group key from another device 115 of the mesh network 110. If not, the device 105 may determine whether the predetermined number has been reached at block 820. If not, the method may return to block 815. If so, the device 105 may generate a new common group key at block 825. Then at block 830, the device may send its new common group key in a secure manner to the other member devices of the mesh network 110 via the mesh network.

If the device 105 has received a new common group key (e.g., first) from another device 115 of the mesh network 110, then the method 800 may jump from block 815 to block 835. At block 835, the device 105 may determine whether a predetermined time has elapsed since the device 105 received the new common group key (first received new common group key). If so, the method 800 may continue to block 840, where the device 105 may stop/discontinue its count down. Then, at block 845, the device 105 may update to the new common group key (first and only received).

If the predetermined time has not elapsed, the method 800 may jump from block 835 to block 850. At block 850, the device 105 may determine whether it has received a new common group key (e.g., second, etc.) from another device 115 of the mesh network 110. If not, the method 800 may return to block 835. If so, the method 800 may continue to block 855, where the device 105 may again determine whether the predetermined time has elapsed since the device 105 received the new common group key (first received new common group key). If not, the method may return to block 850. If so, the method 800 may continue to block 860, where the device 105 determine which of the new common group keys it has received is valid (e.g., using one or more suppression criterion). Then, at block 865, the device 105 may update to the valid new common group key.

Although not depicted, it should be understood that method 800 may include an evaluation between its own generated new common group key and one or more new common group keys received by the device 105 before a predetermined time has elapsed since the device 105 generated or sent its new common group key.

Therefore, the method 800 may be used to manage the common group key for a mesh network in which the common group key includes an expiration time. It should be noted that the method 800 is just one implementation and that other implementations are possible.

It should be understood that the methods described above are not mutually exclusive, and may be combined (in part or in whole) with one another as appropriate or desired to achieve a desired implementation.

The foregoing description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments. The following description uses the terms DTX and discontinuous transmission interchangeably.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD- ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for communications via a mesh network, comprising:
    identifying a member device from a plurality of member devices of an existing mesh network;
    communicating with the identified member device to participate in a single authentication procedure; and
    upon successfully completing the single authentication procedure, joining the existing mesh network without needing any additional authentication procedures with another member device of the plurality of member devices to join the existing mesh network, wherein the communicating with the identified member device to participate in the single authentication procedure comprises:
    sending an authentication request including a first public value to the identified member device, the first public value being generated using a password element and a first nonce, the password element being generated from a password in common with the identified member device;
    receiving an authentication response including a second public value from the identified member device, the second public value being generated using the password element and a second nonce, the password element being generated from the password in common;
    generating a pairwise master key (PMK) using the first and second public values; and
    generating a pairwise transient key (PTK) using the generated PMK.

2. The method of claim 1, wherein the communicating with the identified member device to participate in the single authentication procedure further comprises:
    sending an association request including a message integrity code (MIC) to the identified member device, the MIC being generated using the generated PTK; and
    receiving an association response including a common group key for communicating with any of the plurality of member devices of the existing mesh network.

3. The method of claim 2, wherein the association response including the common group key is received only if the MIC included in the association request is correct.

4. The method of claim 2, wherein the common group key included in the received association response is encrypted using the PTK.

5. The method of claim 2, wherein the association request and the association response are protected by the PTK.

6. The method of claim 2, further comprising:
    sending an interne protocol (IP) address request along with the association request.

7. The method of claim 6, further comprising:
    receiving an IP address response along with the association response, wherein the IP address response assigns an IP address.

8. A method for communications via a mesh network, comprising:
    identifying a member device from a plurality of member devices of an existing mesh network;
    communicating with the identified member device to participate in a single authentication procedure;
    upon successfully completing the single authentication procedure, joining the existing mesh network without needing any additional authentication procedures with another member device of the plurality of member devices to join the existing mesh network;
    receiving a common group key for communicating with any of the plurality of member devices of the existing mesh network, a current nonce and a predetermined text;
    generating a mesh key using the common group key, the current nonce and the predetermined text; and
    receiving an update to the current nonce, the generating of the mesh key being performed using the common group key, the predetermined text and the update to the current nonce.

9. A method for communications via a mesh network, comprising:
    identifying a member device from a plurality of member devices of an existing mesh network;
    communicating with the identified member device to participate in a single authentication procedure;
    upon successfully completing the single authentication procedure, joining the existing mesh network without needing any additional authentication procedures with another member device of the plurality of member devices to join the existing mesh network;
    receiving a common group key for communicating with any of the plurality of member devices of the existing mesh network, a current nonce and a predetermined text;
    generating a mesh key using the common group key, the current nonce and the predetermined text; and
    receiving an update to the common group key, the generating of the mesh key being performed using the predetermined text, the current nonce and the update to the common group key.

10. A method for communications via a mesh network, comprising:
    identifying a member device from a plurality of member devices of an existing mesh network;

communicating with the identified member device to participate in a single authentication procedure;
upon successfully completing the single authentication procedure, joining the existing mesh network without needing any additional authentication procedures with another member device of the plurality of member devices to join the existing mesh network;
receiving a common group key for communicating with any of the plurality of member devices of the existing mesh network, a current nonce and a predetermined text;
generating a mesh key using the common group key, the current nonce and the predetermined text;
receiving a discovery message including a mesh key from one or more neighboring devices that is not a member of the existing mesh network;
comparing the generated mesh key with the mesh key included in the discovery message; and
determining whether another mesh network exists for providing a same service as the existing mesh network based at least in part on a result of the comparing.

11. A method for communications via a mesh network, comprising:
identifying a member device from a plurality of member devices of an existing mesh network;
communicating with the identified member device to participate in a single authentication procedure;
upon successfully completing the single authentication procedure, joining the existing mesh network without needing any additional authentication procedures with another member device of the plurality of member devices to join the existing mesh network;
receiving a common group key for communicating with any of the plurality of member devices of the existing mesh network, the common group key including an expiration time value;
initiating a count down from a random number to a predetermined number, the count down being different from the expiration time value and being initiated prior to reaching the expiration time value of the common group key;
upon reaching the predetermined number, generating a new common group key; and
sending the new common group key in a secure manner to the plurality of member devices via the mesh network.

12. The method of claim 11, further comprising:
receiving a first new common group key securely via the mesh network prior to reaching the predetermined number; and
discontinuing the countdown upon receiving the first new common group key.

13. The method of claim 12, further comprising:
receiving a second new common group key securely via the mesh network within a predetermined time of receiving the first new common group key; and
determining which of the first and second new common group keys is valid using one or more suppression criterion.

14. An apparatus for communications by a wireless communication device via a mesh network, comprising:
a first processing circuit configured to identify a member device from a plurality of member devices of an existing mesh network;
a second processing circuit configured to communicate with the identified member device to participate in a single authentication procedure; and
a communications management circuit configured to cause the wireless communication device to join the existing mesh network upon successfully completing the single authentication procedure, without needing any additional authentication procedures with another member device of the plurality of member devices to join the existing mesh network, wherein the second processing circuit is configured to:
send an authentication request including a first public value to the identified member device, the first public value being generated using a password element and a first nonce, the password element being generated from a password in common with the identified member device;
receive an authentication response including a second public value from the identified member device, the second public value being generated using the password element and a second nonce, the password element being generated from the password in common;
generate a pairwise master key (PMK) using the first and second public values; and
generate a pairwise transient key (PTK) using the generated PMK.

15. The apparatus of claim 14, wherein the second processing circuit is configured to:
send an association request including a message integrity code (MIC) to the identified member device, the MIC being generated using the generated PTK; and
receive an association response including a common group key for communicating with any of the plurality of member devices of the existing mesh network.

16. The apparatus of claim 15, wherein the association response including the common group key is received only if the MIC included in the association request is correct.

17. The apparatus of claim 15, wherein the communications management circuit is configured to:
send an internet protocol (IP) address request along with the association request.

18. The apparatus of claim 17, wherein the communications management circuit is configured to:
receive an IP address response along with the association response, wherein the IP address response assigns an IP address.

19. An apparatus for communications via a mesh network, comprising:
means for identifying a member device from a plurality of member devices of an existing mesh network;
means for communicating with the identified member device to participate in a single authentication procedure; and
means for joining the existing mesh network upon successfully completing the single authentication procedure, without needing any additional authentication procedures with another member device of the plurality of member devices to join the existing mesh network, wherein the means for communicating with the identified member device to participate in the single authentication procedure is configured to:
send an authentication request including a first public value to the identified member device, the first public value being generated using a password element and a first nonce, the password element being generated from a password in common with the identified member device;
receive an authentication response including a second public value from the identified member device, the second public value being generated using the password element and a second nonce, the password element being generated from the password in common;
generate a pairwise master key (PMK) using the first and second public values; and
generate a pairwise transient key (PTK) using the generated PMK.

20. The apparatus of claim 19, wherein the means for communicating with the identified member device to participate in the single authentication procedure is configured to:
send an association request including a message integrity code (MIC) to the identified member device, the MIC being generated using the generated PTK; and
receive an association response including a common group key for communicating with any of the plurality of member devices of the existing mesh network.

21. The apparatus of claim 20, wherein the association response including the common group key is received only if the MIC included in the association request is correct.

22. The apparatus of claim 20, wherein the means for communicating with the identified member device to participate in the single authentication procedure is configured to:
send an internet protocol (IP) address request along with the association request.

23. The apparatus of claim 22, wherein the means for communicating with the identified member device to participate in the single authentication procedure is configured to:
receive an IP address response along with the association response, wherein the IP address response assigns an IP address.

24. An apparatus for communications via a mesh network, comprising:
at least one processor;
a memory in electronic communication with the at least one processor; and
instructions stored in the memory, the instructions being executable by the at least one processor to:
identify a member device from a plurality of member devices of an existing mesh network;
communicate with the identified member device to participate in a single authentication procedure; and
join the existing mesh network upon successfully completing the single authentication procedure, without needing any additional authentication procedures with another member device of the plurality of member devices to join the existing mesh network, wherein the instructions executable by the at least one processor to communicate with the identified member device to participate in the single authentication procedure comprise instructions executable by the at least one processor to:
send an authentication request including a first public value to the identified member device, the first public value being generated using a password element and a first nonce, the password element being generated from a password in common with the identified member device;
receive an authentication response including a second public value from the identified member device, the second public value being generated using the password element and a second nonce, the password element being generated from the password in common;
generate a pairwise master key (PMK) using the first and second public values; and
generate a pairwise transient key (PTK) using the generated PMK.

25. The apparatus of claim 24, wherein the instructions executable by the at least one processor to communicate with the identified member device to participate in the single authentication procedure further comprise instructions executable by the at least one processor to:
send an association request including a message integrity code (MIC) to the identified member device, the MIC being generated using the generated PTK; and
receive an association response including a common group key for communicating with any of the plurality of member devices of the existing mesh network.

26. The apparatus of claim 25, wherein the association response including the common group key is received only if the MIC included in the association request is correct.

27. The apparatus of claim 25, wherein the instructions executable by the at least one processor to communicate with the identified member device to participate in the single authentication procedure further comprise instructions executable by the at least one processor to:
send an internet protocol (IP) address request along with the association request.

28. The apparatus of claim 27, wherein the instructions executable by the at least one processor to communicate with the identified member device to participate in the single authentication procedure further comprise instructions executable by the at least one processor to:
receive an IP address response along with the association response, wherein the IP address response assigns an IP address.

29. The apparatus of claim 25, wherein the common group key included in the received association response is encrypted using the PTK.

30. The apparatus of claim 25, wherein the association request and the association response are protected by the PTK.

31. A computer program product for communications via a mesh network, the computer program product comprising a non-transitory computer-readable medium storing instructions when executed by a processor cause the processor to:
identify a member device from a plurality of member devices of an existing mesh network;
communicate with the identified member device to participate in a single authentication procedure; and
join the existing mesh network upon successfully completing the single authentication procedure, without needing any additional authentication procedures with another member device of the plurality of member devices to join the existing mesh network, wherein the instructions executable by the processor to communicate with the identified member device to participate in the single authentication procedure comprise instructions when executed by the processor to cause the processor to:
send an authentication request including a first public value to the identified member device, the first public value being generated using a password element and a first nonce, the password element being generated from a password in common with the identified member device;
receive an authentication response including a second public value from the identified member device, the second public value being generated using the password element and a second nonce, the password element being generated from the password in common;

generate a pairwise master key (PMK) using the first and second public values; and generate a pairwise transient key (PTK) using the generated PMK.

32. The computer program product of claim 31, wherein the instructions when executed by the processor cause the processor to:

send an association request including a message integrity code (MIC) to the identified member device, the MIC being generated using the generated PTK; and receive an association response including a common group key for communicating with any of the plurality of member devices of the existing mesh network.

33. The computer program product of claim 32, wherein the association response including the common group key is received only if the MIC included in the association request is correct.

34. The computer program product of claim 32, wherein the instructions when executed by the processor cause the processor to:

send an internet protocol (IP) address request along with the association request.

35. The computer program product of claim 34, wherein the instructions when executed by the processor cause the processor to:

receive an IP address response along with the association response, wherein the IP address response assigns an IP address.

* * * * *